(12) United States Patent
Lee

(10) Patent No.: US 12,417,418 B2
(45) Date of Patent: Sep. 16, 2025

(54) SYSTEMS AND METHODS FOR WORKSPACE RECOMMENDATIONS

(71) Applicant: Tyco Fire & Security GmbH, Neuhausen am Rheinfall (CH)

(72) Inventor: Young M. Lee, Old Westbury, NY (US)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 0 days.

(21) Appl. No.: 17/572,112

(22) Filed: Jan. 10, 2022

(65) Prior Publication Data
US 2022/0222608 A1    Jul. 14, 2022

Related U.S. Application Data

(60) Provisional application No. 63/136,078, filed on Jan. 11, 2021, provisional application No. 63/136,089, filed on Jan. 11, 2021.

(51) Int. Cl.
*G06Q 10/0631* (2023.01)
*G06Q 10/06* (2023.01)
*G06Q 10/063* (2023.01)
*G06Q 10/0635* (2023.01)

(52) U.S. Cl.
CPC . *G06Q 10/063118* (2013.01); *G06Q 10/0631* (2013.01); *G06Q 10/06* (2013.01); *G06Q 10/063* (2013.01); *G06Q 10/0635* (2013.01)

(58) Field of Classification Search
CPC .. G06Q 10/06; G06Q 10/063; G06Q 10/0631; G06Q 10/06312; G06Q 10/06313; G06Q 10/06314; G06Q 50/163
See application file for complete search history.

(56) References Cited

U.S. PATENT DOCUMENTS

2002/0188489 A1* 12/2002 Cheng .............. G06Q 10/06316
                                                          705/7.42
2009/0248704 A1* 10/2009 Greenwell ............. G06Q 10/06
2013/0226320 A1*  8/2013 Berg-Sonne ....... G06Q 10/0631
                                                             700/90

(Continued)

FOREIGN PATENT DOCUMENTS

WO    WO-2021262887 A1 * 12/2021

*Primary Examiner* — Rutao Wu
*Assistant Examiner* — Sarjit S Bains
(74) *Attorney, Agent, or Firm* — Foley & Lardner LLP

(57) ABSTRACT

A method for improved workspace recommendations according to distances between spaces. The method includes determining distances between a plurality of candidate workspaces and spaces of a building; assigning a first weight to distances between the plurality of candidate workspaces and occupied workspaces and a second weight to distances between the plurality of candidate workspaces and spaces of the building that are associated with a schedule of spaces in which a user will be located; determining a prediction score for a candidate workspace by aggregating a first sum of distances between the candidate workspace and the workspaces according to the first weight with a second sum of distances between the candidate workspace and the spaces that are associated with the schedule of spaces according to the second weight; and generating a recommendation assigning the user to the candidate workspace based on the prediction score.

20 Claims, 13 Drawing Sheets

(56) References Cited

U.S. PATENT DOCUMENTS

| | | | |
|---|---|---|---|
| 2015/0312696 A1* | 10/2015 | Ribbich | H04W 4/029 |
| | | | 455/418 |
| 2016/0140591 A1* | 5/2016 | Wood | G06N 5/02 |
| | | | 705/5 |
| 2018/0299843 A1* | 10/2018 | Ray | G05B 13/0265 |
| 2018/0308029 A1* | 10/2018 | Löffler | H04W 4/12 |
| 2019/0172165 A1* | 6/2019 | Verteletskyi | G06Q 10/06315 |
| 2020/0111036 A1* | 4/2020 | Gulas | H04L 41/40 |
| 2021/0089973 A1* | 3/2021 | Hirasawa | G06Q 10/0631 |
| 2021/0097596 A1* | 4/2021 | Gaber | G06Q 30/0631 |
| 2021/0150105 A1* | 5/2021 | Benjamin | G06F 30/20 |

\* cited by examiner

SYSTEMS AND METHODS FOR WORKSPACE RECOMMENDATIONS

CROSS-REFERENCE TO RELATED PATENT APPLICATIONS

This application claims the benefit of and priority to U.S. Provisional Patent Application No. 63/136,078 filed Jan. 11, 2021 and U.S. Provisional Patent Application No. 63/163,089 filed Jan. 11, 2021, the contents of each of which are incorporated herein by reference in their entirety for all purposes.

BACKGROUND

The present disclosure relates generally to building management systems (BMS), and more particularly to recommending workspaces to individuals that enter a building.

Over time, companies have shifted to a dynamic workspace environment from a traditional environment. To accommodate this shift, companies have adopted alternative work policies such as hoteling, hot-desking, or unassigned workstations. Employees working in such an environment may arrive at work and choose (or be assigned) to a workspace (e.g., a desk, cubicle, office, etc.) for a day or some other duration.

However, with the onset of infectious diseases, such as COVID-19, many employers are abandoning dynamic workspaces in favor of implementing telecommuting policies or returning to the static workspace environment to avoid placing their employees at risk. Previous dynamic workspace allocation was often designed around personal convenience or preference. Such dynamic workspace allocation made it difficult to control the spread of infectious diseases as people worked in workspaces that constantly varied in population and occupancy without building owners having much control over where people worked or traveled within the building.

Moreover, because many people may be infected with an infectious disease without experiencing any symptoms, people may not be careful when selecting a workspace and choose a space that is too close to others, accelerating the spread of the disease. Further, because people take different degrees of caution over the spread of diseases, it can be difficult to predict the workspaces individuals would choose or configure heating, ventilation, and air conditioning (HVAC) equipment to accommodate the unpredictable population densities of spaces within the building.

SUMMARY

One implementation of the present disclosure is a method for generating improved workspace recommendations according to distances between spaces. The method includes determining, by one or more processors, distances between a plurality of candidate workspaces and one or more spaces of a building. The method includes assigning, by the one or more processors, a first weight to distances between the plurality of candidate workspaces and one or more occupied workspaces and a second weight to distances between the plurality of candidate workspaces and one or more spaces of the building that are associated with a schedule of spaces in which a user will be located. The method further includes determining, by the one or more processors, a prediction score for a candidate workspace by aggregating a first sum of distances between the candidate workspace and the one or more occupied workspaces according to the first weight with a second sum of distances between the candidate workspace and the one or more spaces that are associated with the schedule of spaces according to the second weight. The method further includes generating, by the one or more processors, a recommendation assigning the user to the candidate workspace based on the prediction score.

In some embodiments, the method includes determining, by the one or more processors, a minimum distance flag has been selected, and responsive to the determination that the minimum distance flag has been selected, filtering, by the one or more processors, candidate workspaces from the plurality of candidate workspaces that are associated with a determined distance from an occupied workspace that is below a threshold.

In some embodiments, the method includes generating, by the one or more processors, a distance matrix comprising identifications of occupied workspaces and unoccupied workspaces and updating, by the one or more processors, the distance matrix to exclude the candidate workspaces that are associated with a determined distance from an occupied workspace that is below the threshold.

In some embodiments, the method includes determining, by the one or more processors, whether a space in which the candidate workspace is located is associated with active HVAC equipment and assigning, by the one or more processors, a third weight to the determination as to whether the space in which the respective candidate workspace is located is associated with active HVAC equipment, wherein determining the prediction score for the candidate workspace further includes aggregating the weighted determination.

In some embodiments, the method includes receiving, by the one or more processors, one or more workspace ratings for the candidate workspace and assigning, by the one or more processors, a fourth weight to the one or more workspace ratings, wherein determining the prediction score for the candidate workspace further includes aggregating the weighted workspace ratings.

In some embodiments, the method includes ranking, by the one or more processors, the plurality of candidate workspaces according to respective predictions scores of the plurality candidate workspaces, wherein assigning the user to the workspace is further based on the rankings of the plurality of candidate workspaces.

In some embodiments, the method includes assigning, by the one or more processors, a time period to the recommendation assigning the user to the candidate workspace.

Another implementation of the present disclosure is a system for generating improved workspace recommendations according to distances between spaces. The building system includes one or more processors configured to determine distances between a plurality of candidate workspaces and one or more spaces of a building. The one or more processors are configured to assign a first weight to distances between the plurality of candidate workspaces and one or more occupied workspaces and a second weight to distances between the plurality of candidate workspaces and one or more spaces of the building that are associated with a schedule of spaces in which a user will be located. The one or more processors are configured to determine a prediction score for a candidate workspace by aggregating a first sum of distances between the candidate workspace and the one or more occupied workspaces according to the first weight with a second sum of distances between the candidate workspace and the one or more spaces that are associated with the schedule of spaces according to the second weight and generate a recommendation assigning the user to the candidate workspace based on the prediction score.

In some embodiments, the one or more processors are configured to determine that a minimum distance flag has been selected and responsive to the determination that the minimum distance flag has been selected, filter candidate workspaces from the plurality of candidate workspaces that are associated with a determined distance from an occupied workspace that is below a threshold.

In some embodiments, the one or more processors are configured to generate a distance matrix comprising identifications of occupied workspaces and unoccupied workspaces and update the distance matrix to exclude the candidate workspaces that are associated with a determined distance from an occupied workspace that is below the threshold.

In some embodiments, the one or more processors are configured to determine whether a space in which the candidate workspace is located is associated with active HVAC equipment and assign a third weight to the determination as to whether the space in which the respective candidate workspace is located is associated with active HVAC equipment, wherein determining the prediction score for the candidate workspace further comprises aggregating the weighted determination.

In some embodiments, the one or more processors are configured to receive one or more workspace ratings for the candidate workspace and assign a fourth weight to the one or more workspace ratings, wherein determining the prediction score for the candidate workspace further comprises aggregating the weighted workspace ratings.

In some embodiments, the one or more processors are configured to rank the plurality of candidate workspaces according to respective predictions scores of the plurality candidate workspaces wherein assigning the user to the workspace is further based on the rankings of the plurality of candidate workspaces.

In some embodiments, the one or more processors are configured to assign a time period to the recommendation assigning the user to the candidate workspace.

Another implementation of the present disclosure is a non-transitory computer-readable medium storing program instructions for causing one or more processors to determine distances between a plurality of candidate workspaces and one or more spaces of a building. The program instructions further cause the one or more processors to assign a first weight to distances between the plurality of candidate workspaces and one or more occupied workspaces and a second weight to distances between the plurality of candidate workspaces and one or more spaces of the building that are associated with a schedule of spaces in which a user will be located. The program instructions further cause the one or more processors to determine a prediction score for a candidate workspace by aggregating a first sum of distances between the candidate workspace and the one or more occupied workspaces according to the first weight with a second sum of distances between the candidate workspace and the one or more spaces that are associated with the schedule of spaces according to the second weight and generate a recommendation assigning the user to the candidate workspace based on the prediction score.

In some embodiments, the program instructions further cause the one or more processors to determine that a minimum distance flag has been selected and, responsive to the determination that the minimum distance flag has been selected, filter candidate workspaces from the plurality of candidate workspaces that are associated with a determined distance from an occupied workspace that is below a threshold.

In some embodiments, the program instructions further cause the one or more processors to generate a distance matrix comprising identifications of occupied workspaces and unoccupied workspaces and update the distance matrix to exclude the candidate workspaces that are associated with a determined distance from an occupied workspace that is below the threshold.

In some embodiments, the program instructions further cause the one or more processors to determine whether a space in which the candidate workspace is located is associated with active HVAC equipment and assign a third weight to the determination as to whether the space in which the respective candidate workspace is located is associated with active HVAC equipment, wherein determining the prediction score for the candidate workspace further comprises aggregating the weighted determination.

In some embodiments, the program instructions further cause the one or more processors to receive one or more workspace ratings for the candidate workspace and assign a fourth weight to the one or more workspace ratings, wherein determining the prediction score for the candidate workspace further comprises aggregating the weighted workspace ratings.

In some embodiments, the program instructions further cause the one or more processors to rank the plurality of candidate workspaces according to respective predictions scores of the plurality candidate workspaces, wherein assigning the user to the workspace is further based on the rankings of the plurality of candidate workspaces.

Another implementation of the present disclosure is a method for training a prediction model for workspace assignments. The method includes identifying, by one or more processors, a plurality of candidate workspaces and occupancy states of one or more spaces of a building. The method further includes determining, by the one or more processors, a reward prediction for a candidate workspace by applying an identification of a candidate workspace and identifications of the occupancy states of the one or more spaces to a prediction model. The method further includes determining, by the one or more processors, a reward for the candidate workspace based on distances between the candidate workspace and the one or more spaces. The method further includes training, by the one or more processors, the prediction model based on a difference between the reward prediction and the determined reward.

In some embodiments, the occupancy states comprise one or more of an occupied state, a scheduled meeting room state, an unscheduled meeting room state, or an unoccupied state.

In some embodiments, the method includes determining, by the one or more processors, a minimum distance flag has been selected and, responsive to the determination that the minimum distance flag has been selected, filtering, by the one or more processors, candidate workspaces from the plurality of candidate workspaces that are associated with a determined distance from an occupied workspace that is below a threshold.

In some embodiments, the reward for the candidate workspace includes identifying, by the one or more processors, spaces of the one or more workspaces that correspond to a group entity and assigning, by the one or more processors, a weight to distances between the candidate workspace and the identified spaces that correspond to the group entity, wherein determining the reward for the workspace prediction is based further on a sum of the distances between the candidate workspace and the identified spaces that correspond to the group entity according to the weight.

In some embodiments, the reward for the candidate workspace includes determining, by the one or more processors, a space in which the candidate workspace is located is associated with active HVAC equipment and determining, by the one or more processors, the reward for the candidate workspace based further on the determination that the space is associated with active HVAC equipment.

In some embodiments, the reward prediction is a first reward prediction and the candidate workspace is a first candidate workspace, the method including determining, by the one or more processors, a second reward prediction for a second candidate workspace by applying an identification of the second candidate workspace and identifications of the one or more spaces to the trained prediction model and assigning, by the one or more processors, a user to the second candidate workspace based on the second reward prediction.

In some embodiments, the method includes adjusting, by the one or more processors, operation of building equipment of the building according to the assignment.

In some embodiments, determining the reward includes assigning, by the one or more processors, weights to the distances between the workspace and the one or more spaces and aggregating, by the one or more processors, the weighted distances.

Another implementation of the present disclosure is a system for training a prediction model for workspace assignments. The system includes one or more processors configured to identify a plurality of candidate workspaces and occupancy states of one or more spaces of a building. The one or more processors are further configured to determine a reward prediction for a candidate workspace by applying an identification of a candidate workspace and identifications of the occupancy states of the one or more spaces to a prediction model. The one or more processors are further configured to determine a reward for the candidate workspace based on distances between the candidate workspace and the one or more spaces. The one or more processors are further configured to train the prediction model based on a difference between the reward prediction and the determined reward.

In some embodiments, the occupancy states include one or more of an occupied state, a scheduled meeting room state, an unscheduled meeting room state, or an unoccupied state.

In some embodiments, the one or more processors are configured to determine a minimum distance flag has been selected and, responsive to the determination that the minimum distance flag has been selected, filter candidate workspaces from the plurality of candidate workspaces that are associated with a determined distance from an occupied workspace that is below a threshold.

In some embodiments, the one or more processors are configured to identify spaces of the one or more workspaces that correspond to a group entity and assign a weight to distances between the candidate workspace and the identified spaces that correspond to the group entity, wherein determining the reward for the workspace prediction is based further on a sum of the distances between the candidate workspace and the identified spaces that correspond to the group entity according to the weight.

In some embodiments, the one or more processors are configured to determine a space in which the candidate workspace is located is associated with active HVAC equipment and determine the reward for the candidate workspace based further on the determination that the space is associated with active HVAC equipment.

In some embodiments, the reward prediction is a first reward prediction and the candidate workspace is a first candidate workspace, the one or more processors configured to determine a second reward prediction for a second candidate workspace by applying an identification of the second candidate workspace and identifications of the one or more spaces to the trained prediction model and assigning, by the one or more processors, a user to the second candidate workspace based on the second reward prediction.

In some embodiments, the one or more processors are configured to adjust operation of building equipment of the building according to the assignment.

In some embodiments, the one or more processors are configured to determine the reward by assigning weights to the distances between the workspace and the one or more spaces and aggregating the weighted distances.

Another implementation of the present disclosure is a non-transitory computer-readable medium storing program instructions for causing one or more processors to train a prediction model for workspace assignments. The program instructions further cause the one or more processors to configured to identify a plurality of candidate workspaces and occupancy states of one or more spaces of a building. The program instructions further cause the one or more processors to determine a reward prediction for a candidate workspace by applying an identification of a candidate workspace and identifications of the occupancy states of the one or more spaces to a prediction model. The program instructions further cause the one or more processors to determine a reward for the candidate workspace based on distances between the candidate workspace and the one or more spaces. The program instructions further cause the one or more processors to train the prediction model based on a difference between the reward prediction and the determined reward.

In some embodiments, the occupancy states include one or more of an occupied state, a scheduled meeting room state, an unscheduled meeting room state, or an unoccupied state.

In some embodiments, the program instructions further cause the one or more processors to determine a minimum distance flag has been selected and, responsive to the determination that the minimum distance flag has been selected, filter candidate workspaces from the plurality of candidate workspaces that are associated with a determined distance from an occupied workspace that is below a threshold.

In some embodiments, the program instructions further cause the one or more processors to identify spaces of the one or more workspaces that correspond to a group entity and assign a weight to distances between the candidate workspace and the identified spaces that correspond to the group entity, wherein determining the reward for the workspace prediction is based further on a sum of the distances between the candidate workspace and the identified spaces that correspond to the group entity according to the weight.

In some embodiments, the program instructions further cause the one or more processors to determine a space in which the candidate workspace is located is associated with active HVAC equipment and determine the reward for the candidate workspace based further on the determination that the space is associated with active HVAC equipment.

In some embodiments, the reward prediction is a first reward prediction and the candidate workspace is a first candidate workspace, the program instructions further cause the one or more processors to determine a second reward prediction for a second candidate workspace by applying an identification of the second candidate workspace and identifications of the one or more spaces to the trained prediction model and assigning, by the one or more processors, a user to the second candidate workspace based on the second reward prediction.

In some embodiments, the program instructions further cause the one or more processors to adjust operation of building equipment of the building according to the assignment.

In some embodiments, the program instructions further cause the one or more processors to determine the reward by assigning weights to the distances between the workspace and the one or more spaces and aggregating the weighted distances.

DETAILED DESCRIPTION

Overview

Referring generally to the figures, systems and methods for recommending a workspace within a building are disclosed herein. In various embodiments, workspaces are determined according to various parameters such as a proximity to other individuals, a proximity to meeting locations, a proximity to team members, building energy costs associated with a space, and/or user feedback. In some embodiments, workspaces are determined using an optimization algorithm. Additionally or alternatively, workspaces may be determined using machine learning techniques such as reinforcement learning. The systems and methods disclosed herein may facilitate increased productivity, improved employee wellness, reduced energy costs, improved worker safety, and/or the like.

Building and HVAC Systems

Figure 1:
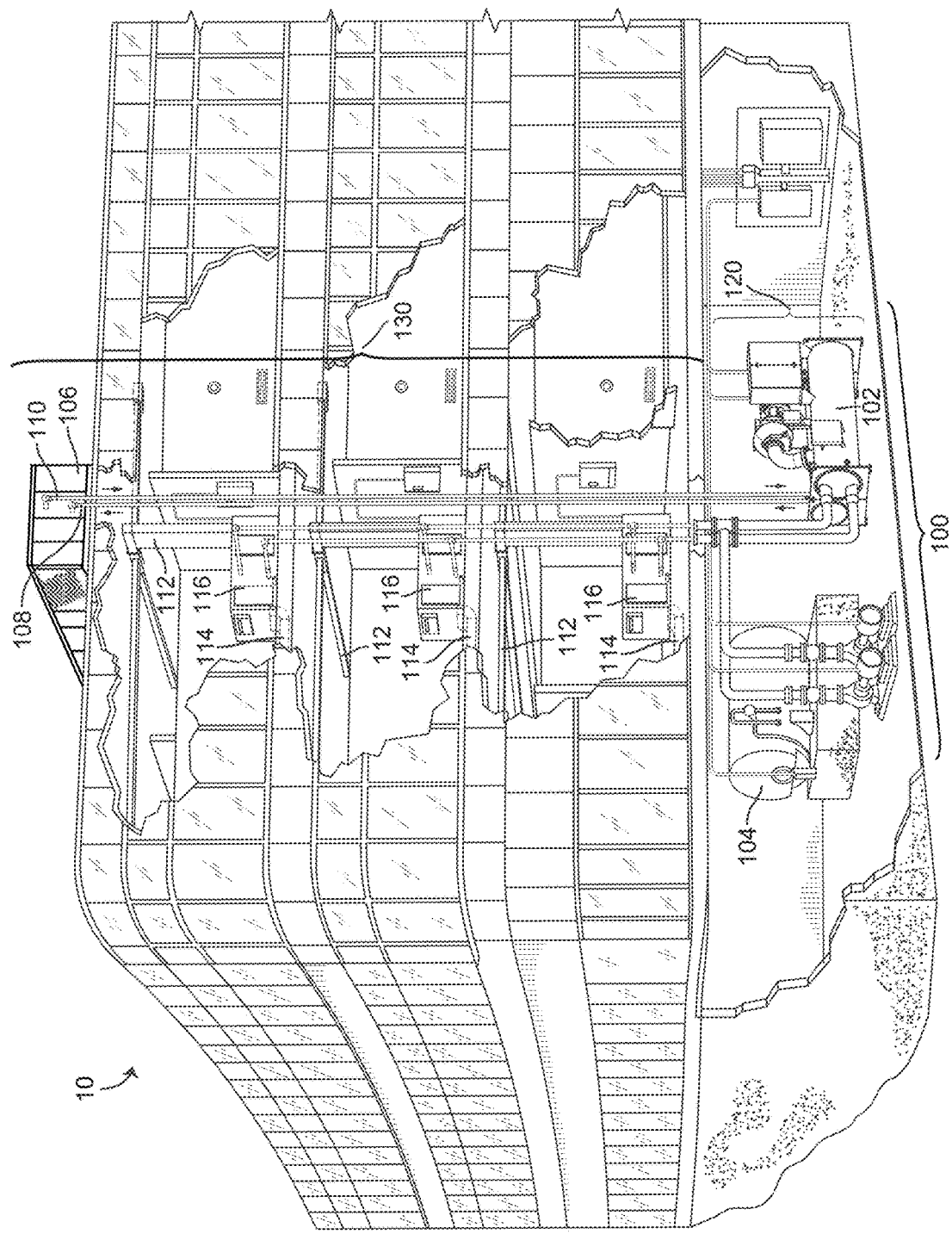
FIG. 1 is a perspective view of a smart building, according to some embodiments.

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Figure 2:
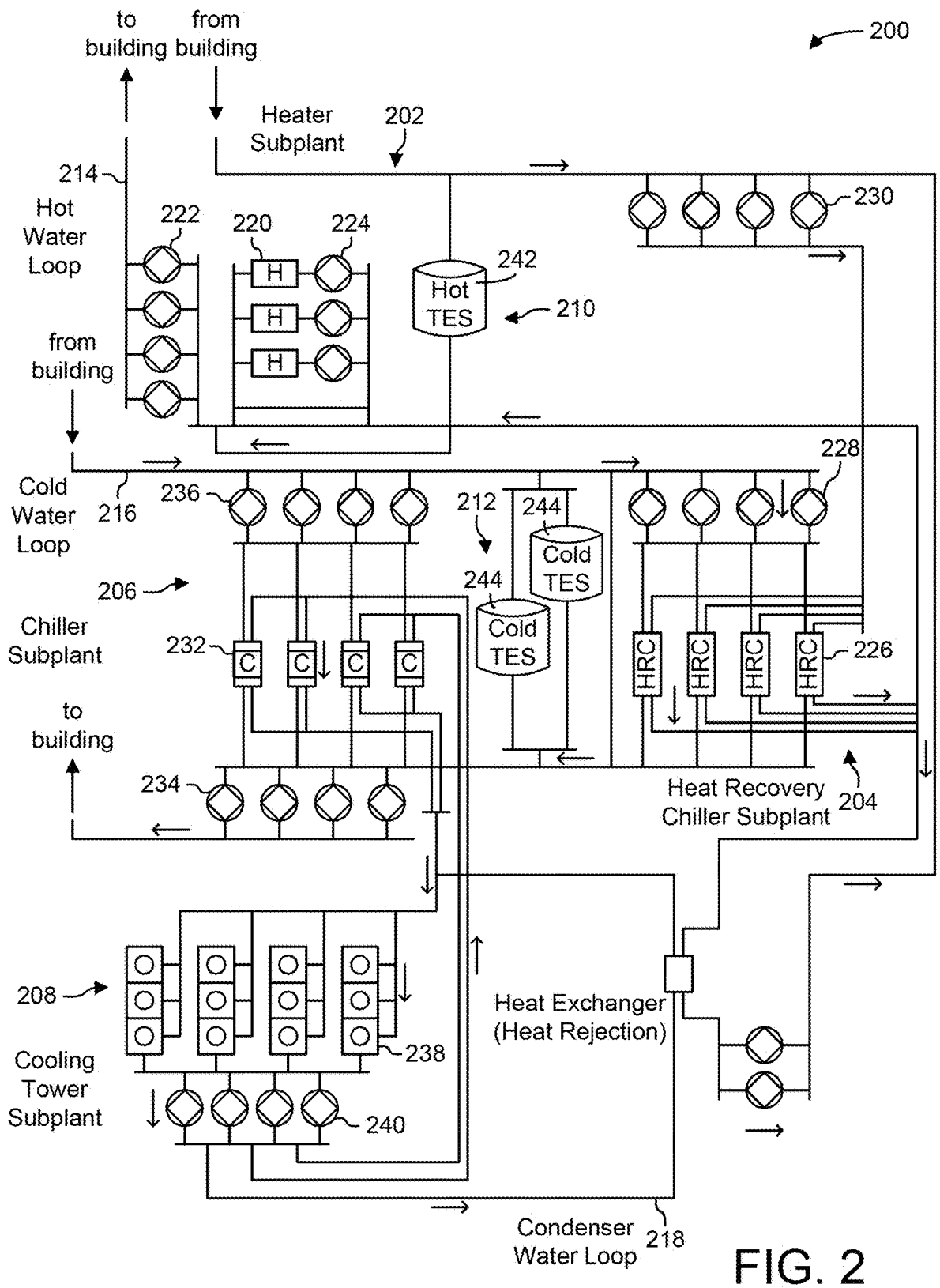
FIG. 2 is a block diagram of a waterside system, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Figure 3:
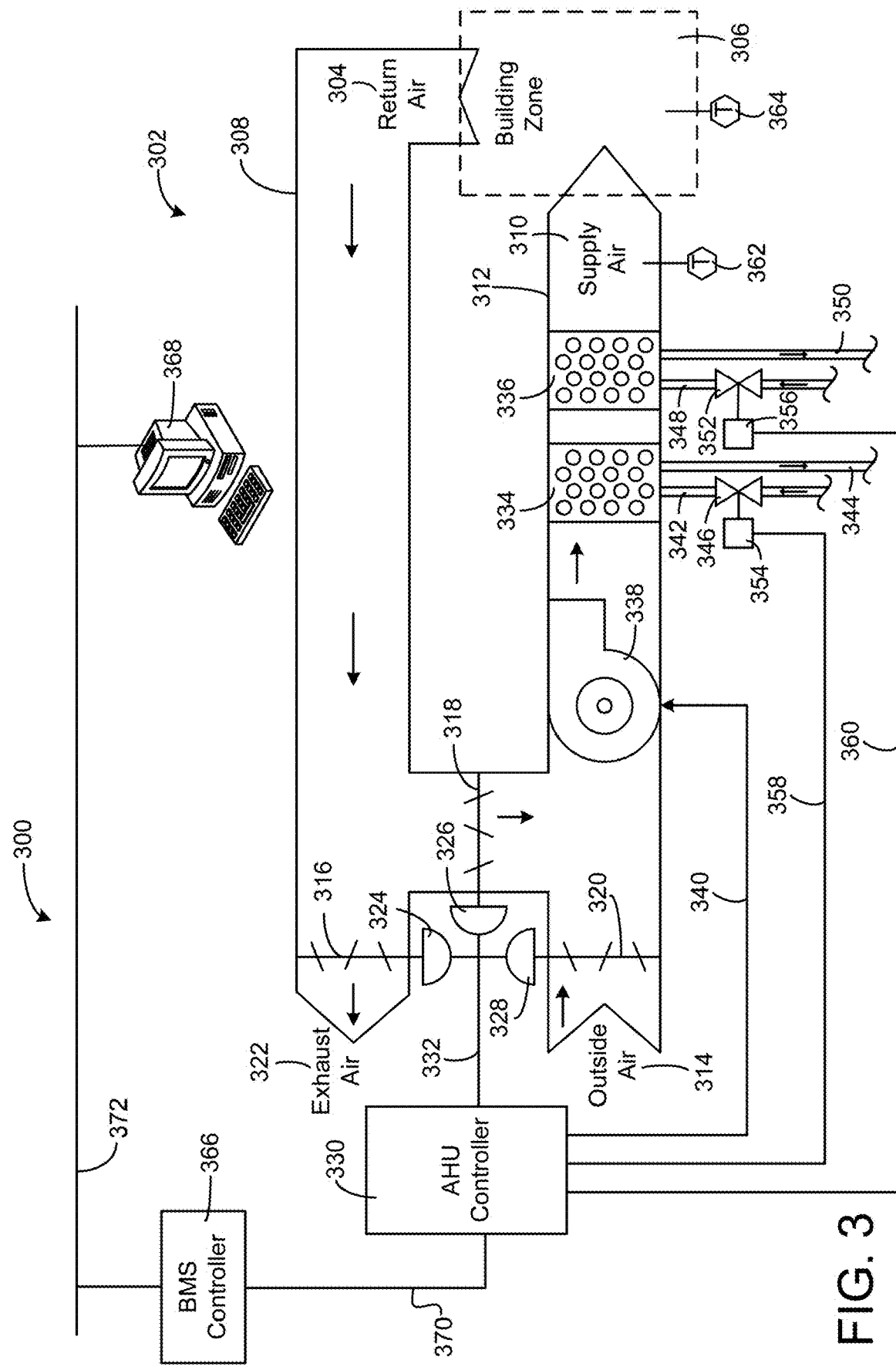
FIG. 3 is a block diagram of an airside system, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or nonmobile device. Client device 368 may communicate with BMS controller 366 and/or AHU controller 330 via communications link 372.

Building Management Systems

Figure 4:
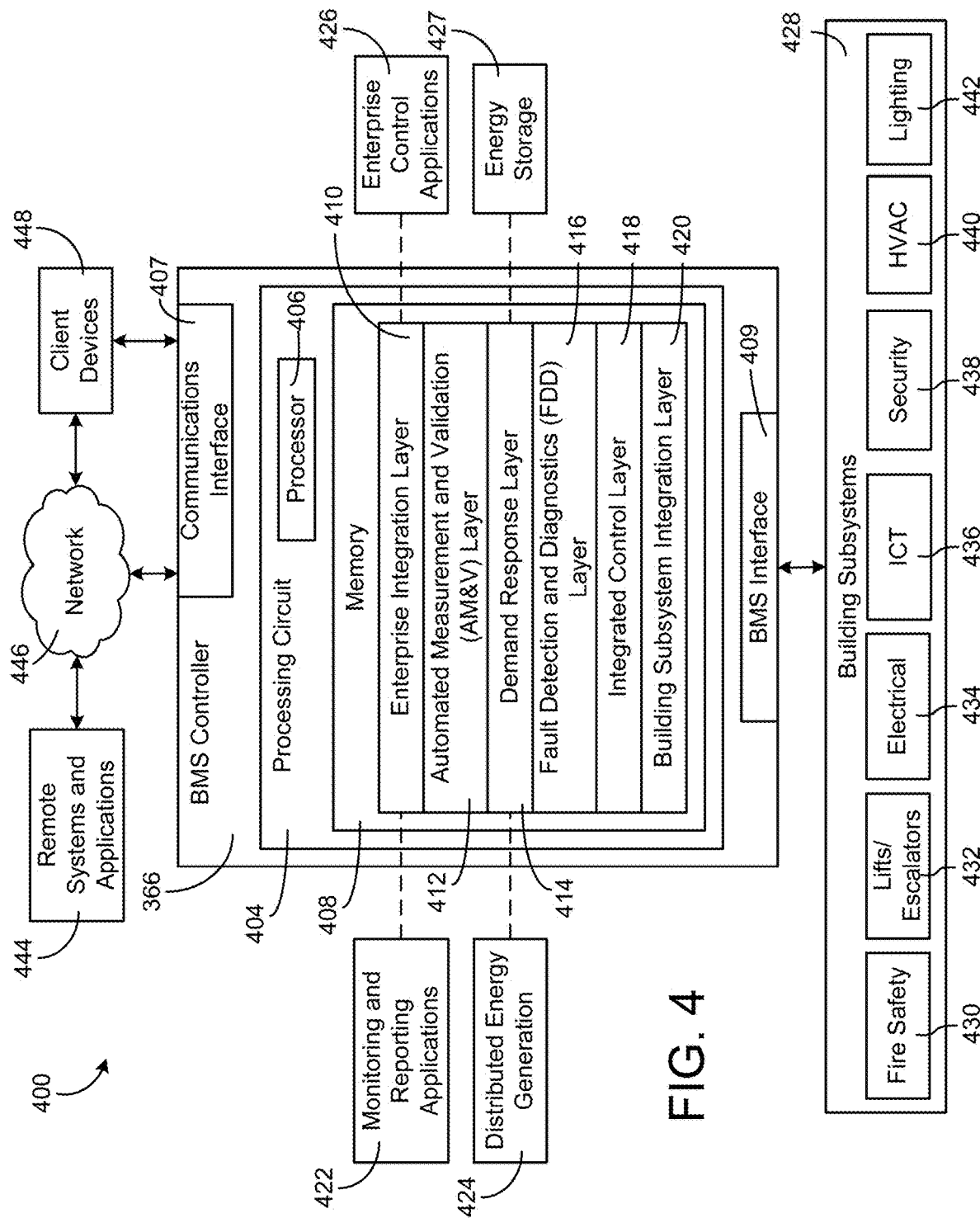
FIG. 4 is a block diagram of a building management system, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In some embodiments, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine control actions for building subsystems 428 based on the inputs, generate control signals based on the determined control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which reduce energy costs based on one or more inputs representative of or based on demand (e.g., price, a curtailment signal, a demand level, etc.). In some embodiments, demand response layer 414 uses equipment models to determine a set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
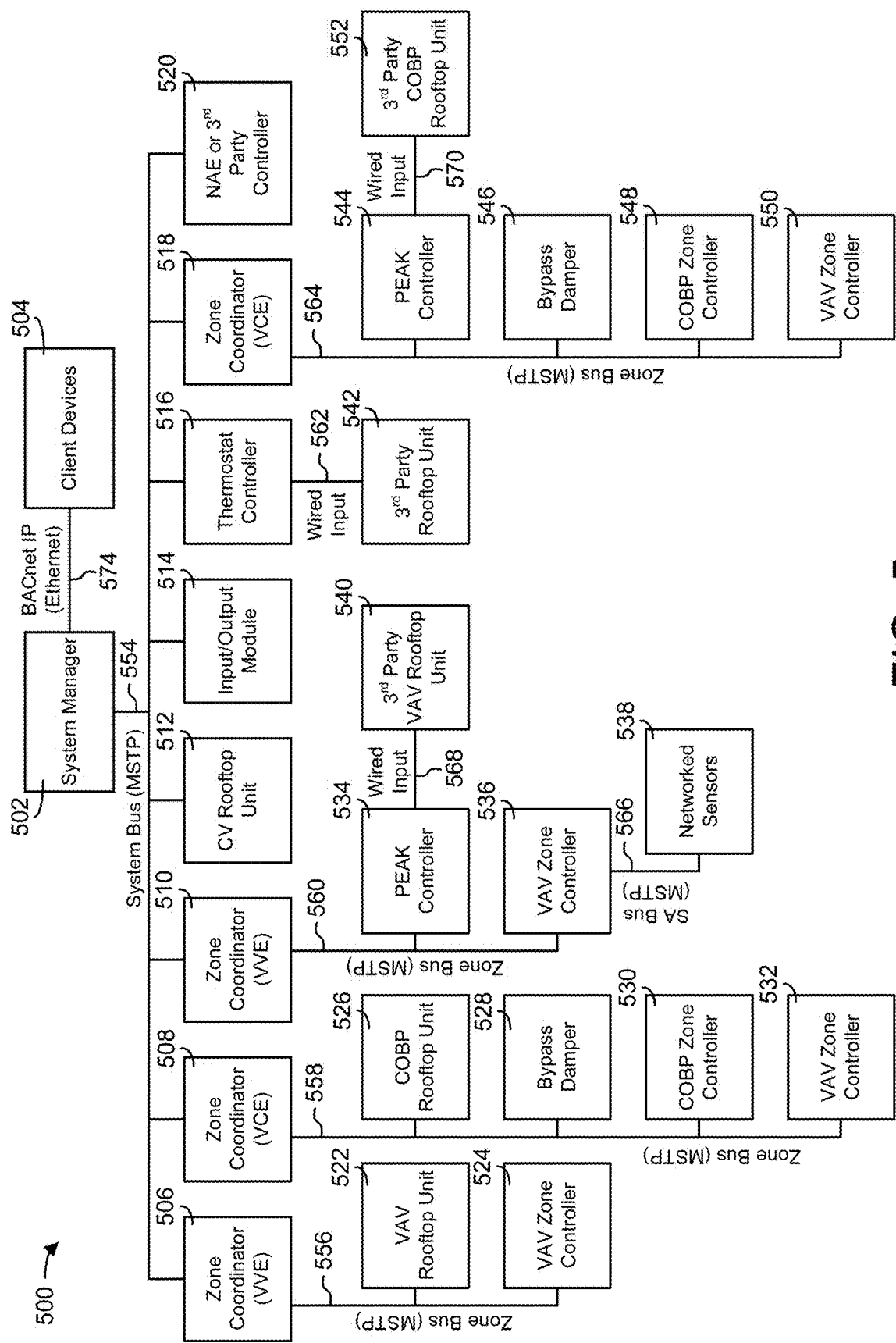
FIG. 5 is a block diagram of a smart building environment, according to some embodiments.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Workspace Allocation System

System

Figure 6:
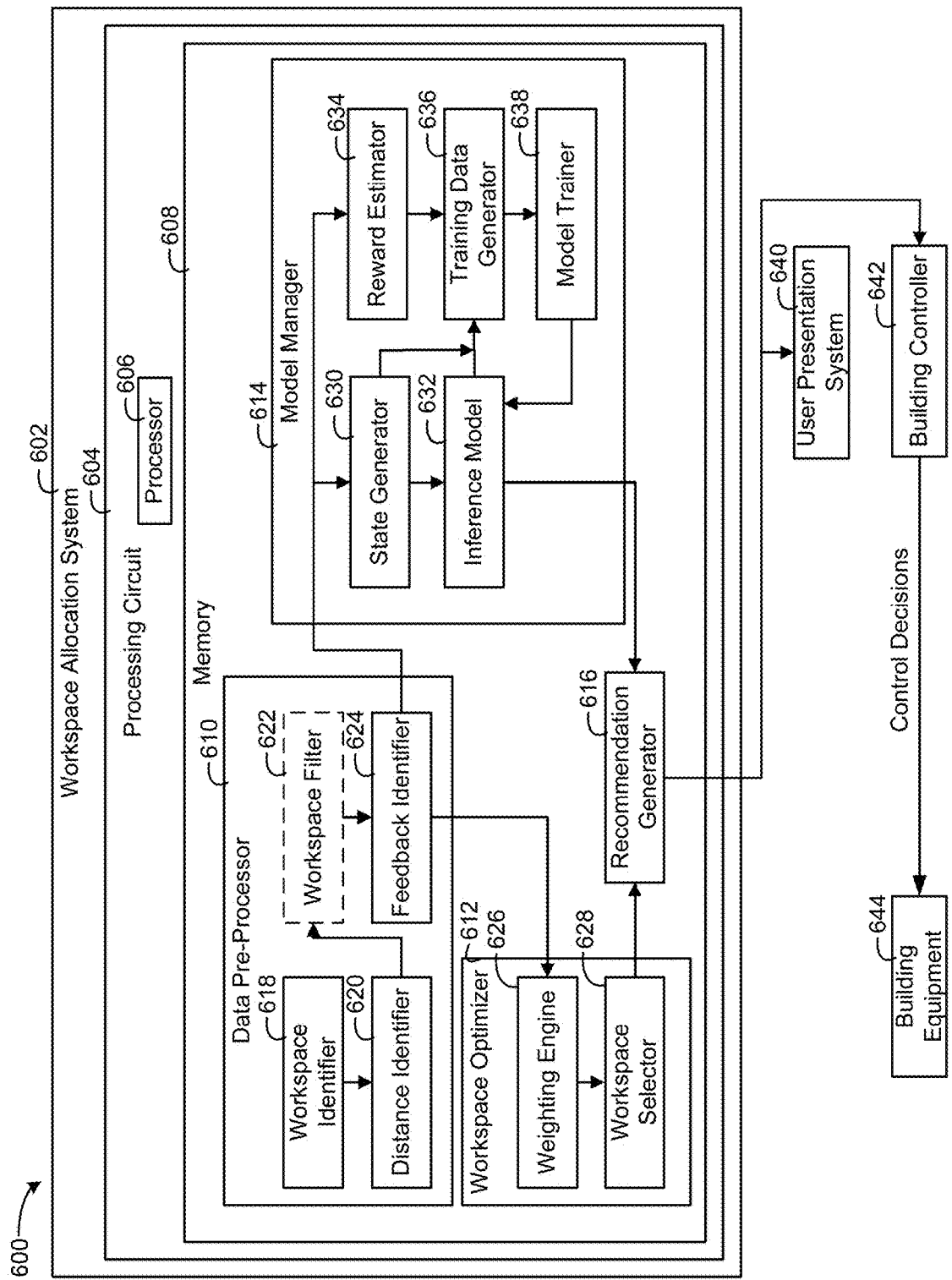
FIG. 6 is a block diagram of a system including a workspace allocation system, according to some embodiments.

Referring now to FIG. 6, a block diagram of a system 600 including a workspace allocation system 602 that is configured to generate recommendations assigning entities (e.g., people) to workspaces in a building management system (e.g., BMS 400 or 500), according to an exemplary embodiment. Workspace allocation system 602 may implement an optimization model or a reinforcement learning model to generate workspace recommendations for people that enter a building of the building management system. Workspace allocation system 602 may do so based on determined distances between individual workspaces and other occupied workspaces and/or spaces that the entity is scheduled to enter during a given time period (e.g., a day, week, month, etc.). Additionally, workspace allocation system 602 may use the current state of operating HVAC equipment and/or lighting that service individual zones of the building and/or user feedback about individual spaces to generate the workspace recommendations.

System 600 may include a user presentation system 640, a building controller 642, and building equipment 644. Building controller 642 may be similar to or the same as BMS controller 366. Workspace allocation system 602 may be a component of or be within building controller 642. In some embodiments, workspace allocation system 602 operates in the cloud as one or more cloud servers. Components 602 and 640-642 may communicate over a network (e.g., a synchronous or asynchronous network).

Workspace allocation system 602 may include a processing circuit 604, a processor 606, and a memory 608. Processing circuit 604, processor 606, and/or memory 608 can be the same as, or similar to, processing circuit 404, processor 406, and/or memory 408, as described with reference to FIG. 4. Memory 608 may include a data pre-processor 610, a workspace optimizer 612, a model manager 614, and/or a recommendation generator 616. Memory 608 may include any number of components.

Data pre-processor 610 can include instructions performed by one or more servers or processors (e.g., processing circuit 604), in some embodiments. In some embodiments, data pre-processor 610 includes a workspace identifier 618, a distance identifier 620, a workspace filter 622, and a feedback identifier 624.

Workspace optimizer 612 includes instructions performed by one or more servers or processors (e.g., processing circuit 604), in some embodiments. In some embodiments, workspace optimizer 612 includes a weighting engine 626 and a workspace selector 628.

Model manager 614 includes instructions performed by one or more servers or processors (e.g., processing circuit 604), in some embodiments. In some embodiments, model manager 614 includes a state generator 630, an inference model 632, a reward estimator 634, a training data generator 636, and a model trainer 638.

Workspace Recommendations Using a Weighting Model

Figure 7:
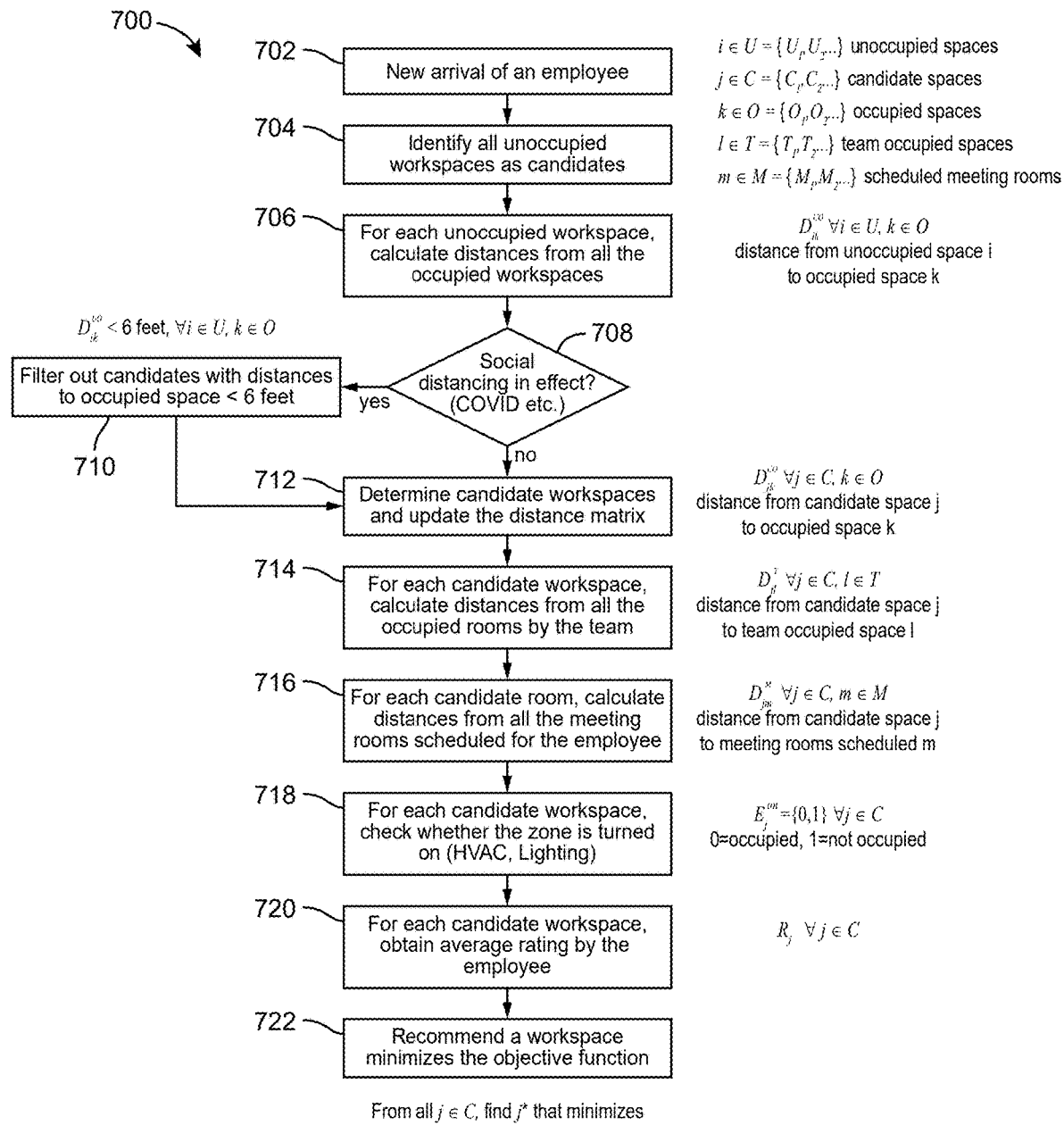
FIG. 7 is a flow diagram of a process for recommending a workspace using a weighted optimization model, according to some embodiments.

Referring now to FIG. 7, a flow diagram of a process 700 for recommending a workspace using a weighted optimization model is shown, according to some embodiments. Process 700 may be performed by a data processing system (e.g., workspace allocation system 602). Process 700 may include any number of steps and the steps may be performed in any order. At a step 702, the data processing system may detect the arrival of an employee. The data processing system may detect the employee's arrival when the employee enters a building that the data processing system manages. For example, the building may include sensors (e.g., depth or biometric sensors) at its entrance that may detect when people enter or leave the building. The sensors may detect the arrival of the employee when the employee enters the building and send a signal indicating the detection to the data processing system. In some embodiments, the sensors may detect biometric data of the employee (e.g., a finger scan or an iris scan). The sensors may send such biometric data to the data processing system so the data processing system may identify the employee. Similarly, in some embodiments, the building may include cameras or video recorders that may detect when the employee enters the building and take pictures or a video of the employee to send to the data processing system. The data processing system may receive such pictures or footage and use object recognition techniques to identify the identity of the employee. In some other embodiments, the employee may input authentication information (e.g., username and password) into a user interface of the data processing system. The data processing system may detect the new arrival and/or his or her identity based on the authentication information.

In some embodiments, the data processing system may identify a group entity (e.g., team or company) that employs the employee or with which the employee is otherwise associated. The data processing system may identify the group entity based on an association between the employee and the group entity that is stored in memory of the data processing system. For example, upon identifying the identity of the employee, the data processing system may identify the group entity with which the employee is associated by retrieving information about the employee from the data processing system's memory and identifying the group entity from the retrieved information. In some embodiments, the data processing system may identify the group entity based on an input that the employee provides to a user interface on a display upon entering the building. While the present disclosure discusses employer-employee relationships, it should be understood that the features of the present disclosure can be utilized in allocating space for any other type of relationship (e.g., allocate space to students or faculty/staff within a school or university space, allocate space to volunteers or members of an organization, etc.).

At a step 704, the data processing system may identify the unoccupied workspaces of the building. As defined herein, a workspace may be a space that may be designated as a location for an employee to work during a set time period. Unoccupied workspaces may be workspaces that are not currently occupied by a person. Unoccupied workspaces may be candidate workspaces to which the data processing system may assign the newly arrived employee. Upon detecting the employee arrived, the data processing system may identify the occupancy states (e.g., occupied, unoccupied, occupied by another user that is associated with a matching group entity, scheduled meeting space, etc.) of individual workspace and other spaces of the building (e.g., meeting rooms, hallways, etc.). The occupancy states of the spaces may be stored in memory of the data processing system and may be constantly updated as employees leave the building or are replaced by other employees that enter the building. For example, when the data processing system assigns an employee to a particular workspace within the building, the data processing system may store an association between the workspace and the employee indicating (1) the workspace is occupied by the employee, and (2) the group entity with which the employee is associated. When the data processing system determines the employee leaves (e.g., based on sensor data indicating the employee is no longer at the workspace or has not been at the workspace within a threshold amount of time) or that the employee's time at the workspace is up, the data processing system may update the memory allocated to the workspace by removing the association between the employee and the workspace from memory and updating the state of the workspace to an "unoccupied state."

The data processing system may identify the occupancy states of the workspaces by retrieving and/or identifying the states for the workspaces from memory (e.g., from a database stored in memory). For example, upon detecting that the employee arrived at the building, the data processing system may retrieve the stored states for the workspaces from memory and identify the retrieved states.

In some embodiments, the data processing system may identify the occupancy states based on sensor data. For example, the data processing system may analyze data the data processing system receives from occupancy sensors (e.g., depth sensors) that indicates which workspaces are currently occupied. Responsive to determining someone is in a workspace (or has been in the workspace within a predetermined period of time), the data processing system may determine the workspace is occupied. However, responsive to determining no one has been in the workspace within a predetermined period, the data processing system may determine the workspace is in an unoccupied state. The data processing system may identify the states of the workspaces within the building using any technique.

At a step 706, the data processing system may, for individual unoccupied workspaces, calculate distances between the respective unoccupied workspaces and the occupied workspaces. The data processing system may calculate the distances based on stored coordinates of the occupied and the unoccupied workspaces. For example, the data processing system may identify coordinates that are associated with the unoccupied workspaces and compare the identified coordinates with the coordinates of the occupied workspaces to determine distances between individual occupied and unoccupied workspaces. In some embodiments, the data processing system may store distances between the spaces of the building in memory. Such stored distances may have been previously determined based on the coordinates of the spaces or input by a user. In such embodiments, the data processing system may calculate the distances by retrieving and identifying the distances between unoccupied and occupied spaces of the building from memory.

In some embodiments, the data processing system may only determine distances between workspaces that are within the same zone. A zone may be a room, floor, or other area that includes one or more workspaces and/or meeting rooms. The workspaces or meeting rooms may be labeled with the zone in which they are located. For example, a candidate workspace may be on the second floor of the building, which may have five floors. The data processing system may only determine distances for the candidate workspaces with the other workspaces on the second floor (e.g., only determine distances between spaces that have a matching zone label). Advantageously, because the data processing system may only include distances between workspaces that are within the same zone, the data processing system may avoid extraneous information when attempting to reduce the spread of infectious diseases. It is unlikely such diseases may spread between floors or other separately enclosed spaces, so only determining distances between workspaces that are within the same zone may cause the data processing system to avoid processing extraneous data that could cause the data processing system to determine a sub-optimal workspace (e.g., a workspace with a high chance of causing the spread of infectious disease). Further, depending on the amount workspaces that are within a building, by only determining the distances between workspaces within the same zone, the data processing system may reduce the amount of processing resources that are required to perform the systems and methods described herein, preserving processing resources for other processes (e.g., building management processes).

At a step 708, the data processing system may determine whether a minimum distance flag has been set in the data processing system. The minimum distance flag may correspond to a distance threshold. The threshold may indicate a minimum allowed distance between occupied workspaces in the building. The data processing system may be configured to only assign employees to workspaces with distances above the distance threshold from occupied workspaces when the minimum distance flag is set. In some embodiments, a user may turn off or set the minimum distance flag (and in some cases the distance of the minimum distance flag) via an input to a user interface. Upon receiving such an input, the data processing system may store the state and, in some embodiments, the threshold in memory. The data processing system may identify whether to use a distance threshold to filter out unoccupied workspaces by identifying the state of the minimum distance flag.

In some instances, the data processing system may determine that there are not any candidate workspaces that satisfy the distance threshold (e.g., that each candidate workspaces is within a distance under the distance threshold of an occupied workspace). In such instances, the data processing system may not assign the employee to a workspace and generate an alert that includes such an indication. Consequently, the data processing system may avoid assigning employees to workspaces with a higher likelihood of spreading an infectious disease.

At a step 710, responsive to determining the minimum distance flag is set, the data processing system may filter out unoccupied (e.g., candidate) workspaces that have a distance less than the distance threshold with an occupied workspace. For example, if the distance threshold is set to six feet, the data processing system may compare the distances between the unoccupied workspaces and the occupied workspaces to the six feet threshold. The data processing system may remove any unoccupied workspaces that are within a distance less than the distance threshold from an occupied workspace from consideration as candidate workspaces. Advantageously, by removing such workspaces from consideration, the data processing system may avoid assigning employees to workspaces that could help facilitate the spread of infectious diseases (e.g., workspaces that are too close to each other, increasing the likelihood of airborne transmission).

At a step 712, the data processing system may determine candidate workspaces and update a distance matrix. The data processing system may determine the candidate workspaces by identifying unoccupied workspaces within the building that have not been filtered out based on the distance threshold. Responsive to the minimum distance flag being set, the data processing system may identify unoccupied workspaces that were not filtered out. However, responsive to the minimum distance flag not being set, the data processing system may determine the candidate workspaces include all of the unoccupied workspaces within the building.

Further, the data processing system may generate and update the distance matrix based on the determined candidate workspaces. The distance matrix may be a stored (e.g., in memory) matrix or table that indicates the distances between the different workspaces. The matrix may include labels indicating whether the distances are between unoccupied and occupied workspaces, two occupied workspaces, and/or two unoccupied workspaces. In some embodiments, the matrix may also include distances between workspaces and meeting rooms, or other non-workspace spaces, and may be labeled accordingly. Such labels may indicate whether the employee is scheduled to be in the respective room within the time period associated with the employees schedule.

At a step 714, the data processing system may, for each (non-filtered) candidate workspace, calculate or determine distances between the workspace and workspaces that are occupied by a team member (e.g., the same group entity as the group entity of the employee). To do so, the data processing system may identify the group entity associated with the employee and compare the group entity with the group entities of the occupied workspaces (e.g., compare group entity identifiers). The data processing system may identify the distances between the candidate workspaces and the occupied workspaces that are associated with the same group entity to determine the distances between such workspaces.

At a step 716, the data processing system may, for individual candidate workspace, calculate or determine distances between the respective candidate workspaces and meeting rooms or spaces that the employee is scheduled to enter within a set time period (during a day, week, month, etc.). The data processing system may store, in memory, schedules for employees indicating rooms or spaces in which the employees will be located and, in some cases, the times that the employees will be located in such spaces. Upon identifying the identity of the newly arrived employee, the data processing system may identify and retrieve the employee's schedule from memory based on an identifier (e.g., an account identifier or a name or number) for the employee and identify the rooms or spaces from the schedule. In some embodiments, the employee may upload or scan the schedule into the data processing system upon entering the building and the data processing system can identify the rooms from the scan. In still other embodiments, the employee may input the meeting room, and/or the respective times into a user interface to upload the meeting rooms to a data processing system.

Responsive to identifying the rooms the employee is scheduled to enter, the data processing system may determine the distances between the individual candidate workspaces and the scheduled rooms. The data processing system may do so by identifying determined distances between the candidate workspaces and the scheduled rooms and labeling them accordingly. In some cases, the data processing system may update the distance matrix with the corresponding labels.

At a step 718, the data processing system may, for each candidate workspace, check whether the workspace is within a zone in which the HVAC equipment or lighting is turned on. For example, the data processing system may identify the zones in which the candidate workspaces are located and identify the state or states (e.g., on or off) of the HVAC equipment and/or lighting of the zone. The data processing system may label each candidate workspace with the states of the HVAC equipment and/or lighting. In some cases, the data processing system may update the distance matrix with the corresponding label.

Advantageously, by taking the state of the HVAC equipment and/or lighting into account when determining the workplace to assign the employee, the system may reduce the energy cost within the building. For example, the system may avoid placing employees in zones where the lighting and/or HVAC is turned off because doing so may require the building system to turn on such system components. Instead, the system may first attempt to place the employees in zones where the HVAC equipment and/or lighting are already turned on as doing so would not require any more energy expenditure by the building.

At a step 720, the data processing system may, for each candidate workspace, obtain an average rating by the employee and/or by other employees. The average rating may be user feedback that employees may upload to the data processing system indicating their rating for the respective candidate workspace. Ratings may be numerical values, alphanumerical values, or any other relative values between any range (e.g., 1-10, A-F, etc.). For example, the employee may have previously provided a rating for a workspace via a user interface input when the employee was at the workspace. The data processing system may receive and store such ratings from the employee and/or any other people that have been assigned to work at the workspace. The data processing system may take an average of such ratings to obtain an average rating for the workspace. In some implementations, such as implementations in which the ratings are non-numerical values, the ratings may be converted to numerical values as part of step 720.

At a step 722, the data processing system may recommend a workspace that reduces an objective function. For example, for individual candidate workspaces, the data processing system may apply the following function to obtain a prediction score for individual candidate workspaces:

$$w_1 \sum_{l \in T} D_{jl}^T + w_2 \sum_{m \in M} D_{jm}^M + w_3 E_j^{on} - w_4 R_j$$

where $w_j$=relative weight; $D_{jl}^T$=distance from candidate space j to team occupied space l; $D_{jm}^M$=distance from candidate space j to scheduled meeting rooms m; $E_j^{on}$=whether the zone in which the candidate workspace is located is occupied and/or whether the HVAC equipment and/or lighting is turned on; and $R_j$=the average employee rating for the candidate workspace. The weights $w_j$ may be predetermined (e.g., input by a user) and stored in memory of the data processing system.

The data processing system may apply the aforementioned function for individual candidate workspaces using distances, equipment states, and/or user ratings and their corresponding weights to obtain prediction scores for each candidate workspace. For example, the data processing system may assign weights to each of the distances according to the labels that are associated with the distances. The data processing system may also assign weights to the respective equipment statuses and/or employee ratings for the candidate workspaces. The data processing system may aggregate the weighted values for individual candidate workspace to determine the candidate workspace's respective prediction score. The data processing system may rank or sort the candidate workspaces according to the prediction score and identify the candidate workspace with the lowest (or highest depending on the configuration of the data processing system) prediction score as the workspace to assign the employee.

Upon identifying the candidate workspace to assign the employee, the data processing system may generate a recommendation assigning the employee to the identified candidate workspace. The data processing system may generate the recommendation and store an association between the employee and the assigned workspace within memory. The association may indicate the group entity with which the employee is associated and/or a time period for which the employee is assigned to the workspace. The time period may be input by the employee, be associated with the group entity (e.g., any employees of the group entity may be assigned the same time period), or may be otherwise stored as a predetermined time period by the data processing system. The data processing system may further present the generated recommendation on a display to show the employee the workspace to which he or she has been assigned.

In some instances, the data processing system may adjust the state of the HVAC equipment and/or lighting of a zone upon assigning the employee to a workspace within the zone. For example, the data processing system may assign the employee to a zone that was previously unoccupied or that previously did not have any lighting or HVAC systems turned on. The data processing system may determine the employee was assigned to such a zone and adjust the states of the HVAC equipment and/or lighting to "on" to accommodate the employee working in the zone.

Figure 8:
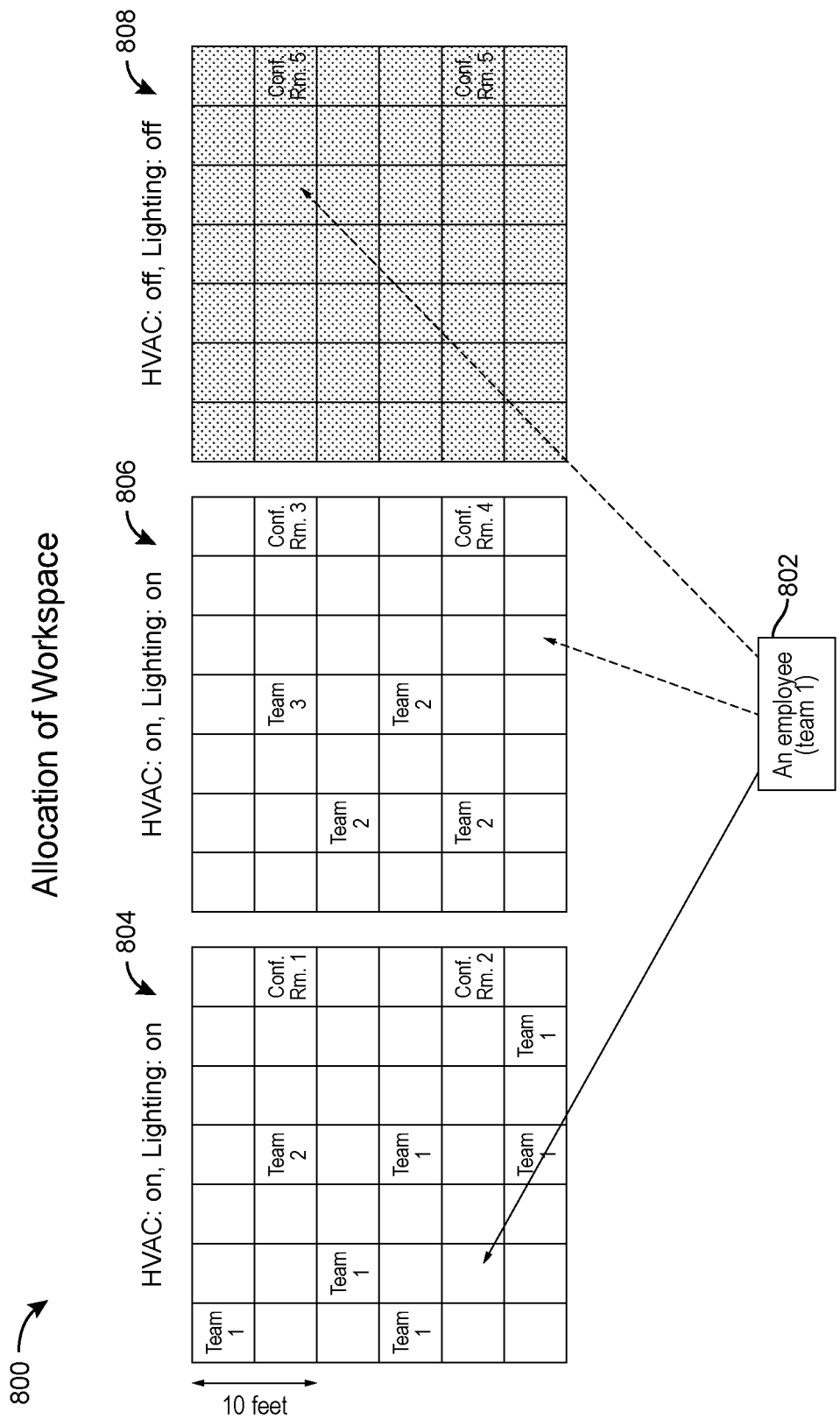
FIG. 8 is a block diagram illustrating different zones to which an entity may be assigned, according to some embodiments.

Referring now to FIG. 8, a block diagram illustrating different zones within a building 800 to which an employee 802 may be assigned is shown, according to some embodiments. The different zones may be or include spaces (e.g., rooms, hallways, offices, etc.) within building 800 at one or more points in time. Such zones may include zones 804, 806, and 808. Upon a user (e.g., an employee) entering building 800, the building management system (e.g., BMS 400) of building 800 may detect (e.g., via generated sensor data or a user input) the user's presence. The building management system may analyze the current occupancy status of zones 804, 806, and 808 using the systems and methods described herein, and select a space (e.g., a workspace) within one of zones 804, 806, and 808 to place or assign the user.

As illustrated, zones 804, 806, and 808 may be divided into different spaces. The spaces may be associated with individual workspaces or conference or meeting rooms. Occupied workspaces may be indicated by a user or group identifier within the respective space. The group identifier may indicate the user's employer or team. Further, zones 804, 806, and 808 may also be associated with indications of whether the HVAC equipment and/or lighting is on or off within the respective zone. Zones 804 and 806 are shown to have HVAC equipment and lighting on while zone 808 is shown to have HVAC equipment and lighting off. The building management system may adjust the states of the HVAC equipment and/or lighting based on whether the respective zone has any workspaces that are occupied or meeting rooms that are scheduled to be occupied at the current time. In some embodiments, responsive to assigning employee 802 to zone 808, the data processing system may turn on the HVAC equipment and/or lighting that corresponds to zone 808. The building management system may implement the systems and methods described herein to assign employee 802 to an unoccupied workspace in one of zones 804, 806, or 808.

Figure 9:
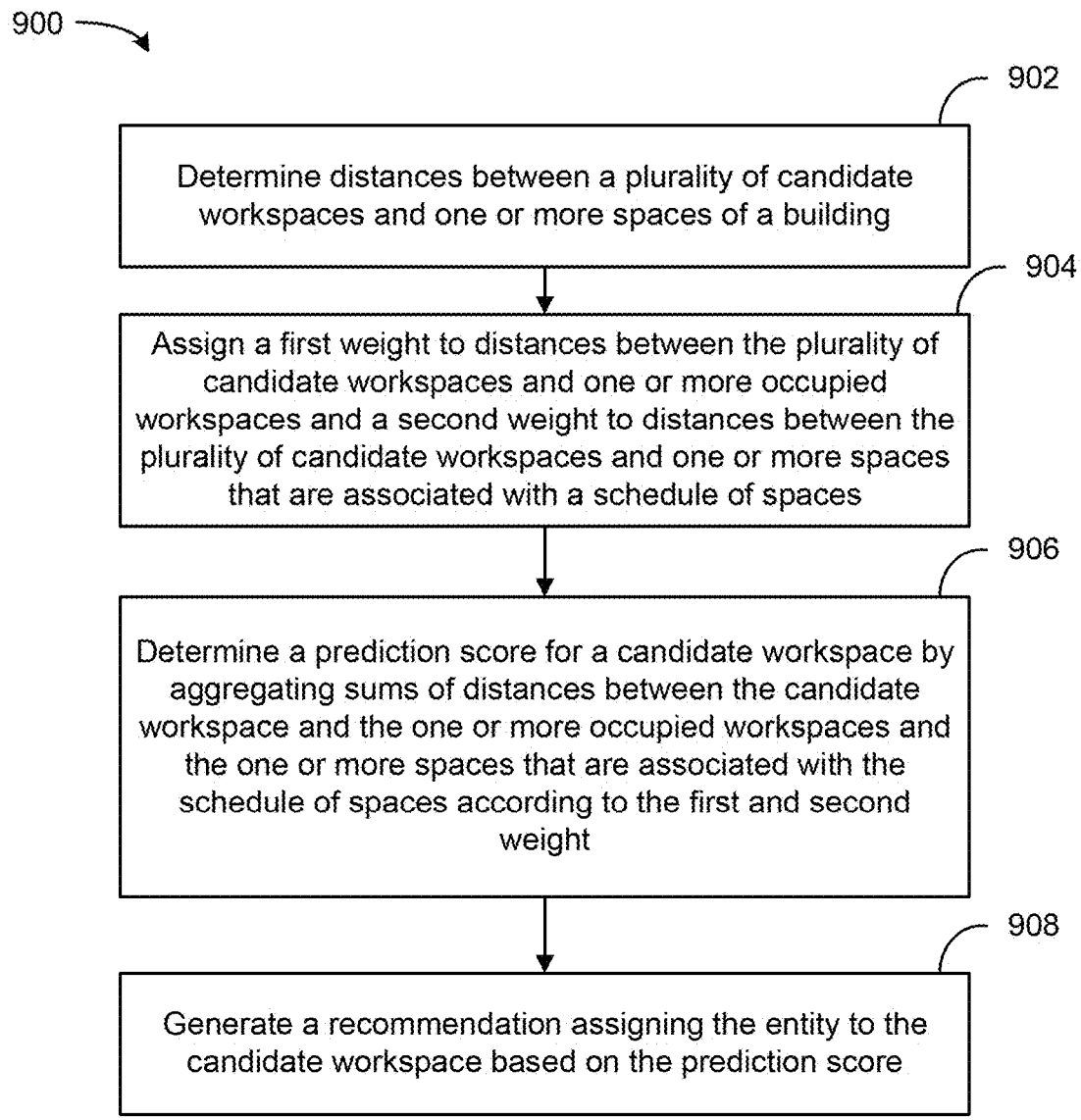
FIG. 9 is a flow diagram of a process for improved workspace recommendations according to distances between spaces, according to some embodiments.

Referring now to FIG. 9, a flow diagram of a process 900 for improved workspace recommendations according to distances between spaces is shown, according to some embodiments. Process 900 may be performed by a data processing system (e.g., workspace allocation system 602). Process 900 may include any number of steps and the steps may be performed in any order. At a step 902, the data processing system may determine distances between a plurality of candidate workspaces and one or more spaces of a building. At a step 904, the data processing system may assign a first weight to distances between the plurality of candidate workspaces and one or more occupied workspaces and a second weight to distances between the plurality of candidate workspaces and one or more spaces that are associated with a schedule of spaces. At a step 906, the data processing system may determine a prediction score for a candidate workspace by aggregating a first sum of distances between the candidate workspace and the one or more occupied workspaces according to the first weight with a second sum of distances between the candidate workspace and the one or more spaces that are associated with the schedule of spaces according to the second weight. At a step 908, the data processing system may generate a recommendation assigning the entity to the candidate workspace based on the prediction score.

Workspace Recommendations Using Reinforcement Learning

Figure 10:
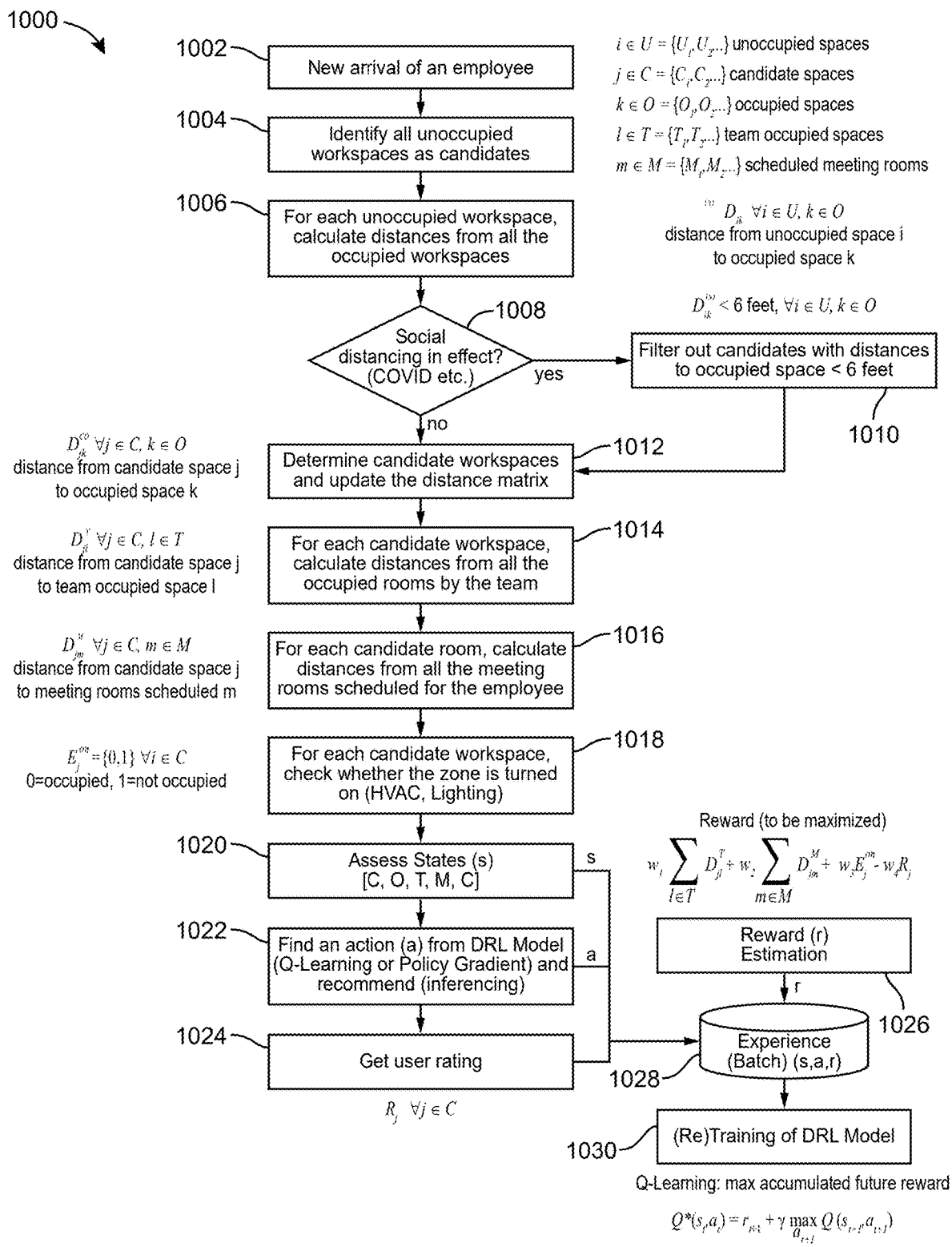
FIG. 10 is a flow diagram of a process for training a prediction model to predict a workspace using reinforcement learning, according to some embodiments.

Referring now to FIG. 10, a flow diagram of a process 1000 for training a prediction model to predict a workspace using reinforcement learning is shown, according to some embodiments. Process 1000 may be performed by a data processing system (e.g., workspace allocation system 602). Process 1000 may include any number of steps and the steps may be performed in any order. At a step 1002, the data processing system may detect the arrival of an employee into a building. At a step 1004, the data processing system may identify unoccupied workspaces within the building as candidate workspaces. At a step 1006, the data processing system may, for individual unoccupied workspaces, calculate distances from occupied workspaces of the building. At a step 1008, the data processing system may determine whether the minimum distance flag is set. Responsive to determining the minimum distance flag is set, at a step 1010, the data processing system may filter out candidate workspaces within a distance threshold of one or more occupied workspaces. At a step 1012, the data processing system may determine candidate workspaces and update a distance matrix. At a step 1014, the data processing system may, for each candidate workspace, calculate distances from the occupied workspaces that are occupied by team members of the newly arrived employee. At a step 1016, the data processing system may, for each candidate workspace, calculate or determine distances between the respective candidate workspace and rooms that are on a schedule of the arrived employee. At a step 1018, the data processing system may, for each candidate workspace, check whether the zone in which the candidate workspace is located has HVAC equipment and/or lighting turned. The data processing system may perform steps 1002-1218 similar to how the data processing system is described as performing steps 702-718, shown and described with reference to FIG. 7.

At a step 1020, the data processing system may identify the states of the spaces within the building. The different states may be or include unoccupied spaces, candidate spaces, occupied spaces, team occupied spaces, and/or scheduled meeting rooms. The states of the spaces may be stored in memory as associations (e.g., flags or labels) with the respective spaces. The data processing system may identify the states of the various spaces by retrieving indications of the spaces from memory and the states that are associated with each space.

At a step 1022, the data processing system may input the states of the spaces into a prediction model. The prediction model may be a Q-learning model (e.g., a deep Q-learning model) or a policy gradient model. For example, in embodiments in which the prediction model is a Q-learning model, the prediction model may be a machine learning model (e.g., a neural network, random forest, support vector machine, clustering algorithm, etc.) that is configured to receive the current state of the spaces of the building and an action (e.g., an assignment to a candidate workspace) as an input and predict a reward as an output. The data processing system may incrementally input actions assigning the employee to each candidate workspace to obtain rewards for the candidate workspaces. The data processing system may identify the action that is associated with the highest reward and generate a recommendation assigning the employee to the corresponding candidate workspace accordingly.

In embodiments in which the prediction model is a policy gradient model, the data processing system may similarly use the policy gradient model to generate a policy that can accurately predict candidate workspaces to assign employees. The data processing system may input the current state of the building to the policy gradient model and receive an output reward for a particular action. The reward may be the highest reward for possible actions (e.g., the candidate workspace that is associated with the highest reward). The data processing system may identify the action and generate a recommendation assigning the employee to the corresponding candidate workspace accordingly.

At a step 1024, the data processing system may receive a user rating. The user rating may be a user input value indicating the user's satisfaction with the assigned workspace. The value may be a numerical input on a predetermined scale or a selection from a list of possible ratings (e.g., bad, okay, average, good, great, etc.). The data processing system may receive the user rating after assigning the user to the workspace predicted by the prediction model. The user may work in the environment and provide an input or provide an input rating the workspace immediately. The data processing system may receive the user rating and use the rating for training as described below.

At a step 1026, the data processing system may use a reward function to determine a reward for the action that was determined by the prediction model. The data processing system may determine the reward using the following function:

$$w_1 \sum_{l \in T} D_{jl}^T - w_2 \sum_{m \in M} D_{jm}^M - w_3 E_j^{on} + w_4 R_j$$

where $w_j$=relative weight; $D_{jl}^T$=distance from candidate space j to a team occupied space l; $D_{jm}^M$=distance from candidate space j to scheduled meeting rooms m; $E_j^{on}$ represents whether the HVAC equipment and/or lighting of the zone of workspace j is turned on (or the zone is otherwise occupied); and $R_j$ is the user rating for the workspace. The weights $w_j$ may be input by a user and stored in memory of the data processing system to be assigned to the respective distances to determine the reward for various predicted workspaces.

The data processing system may apply the aforementioned reward function for individual candidate workspaces using distances, equipment states, and/or user ratings and their corresponding weights to obtain prediction scores for each candidate workspace. For example, the data processing system may assign weights to each of the distances according to the labels that are associated with the distances. The data processing system may also assign weights to the respective equipment statuses and employee ratings for the candidate workspaces. The data processing system may aggregate the weighted values according to the reward function for each candidate workspace to determine the reward for the respective candidate workspace.

At a step 1028, the data processing system may generate training data with the predicted action from the reinforcement learning model and the reward that was determined using the reward function. The training data may include the states of the spaces within the building that were used to predict the candidate workspace, an identification of the candidate workspace (e.g., the action), and the reward the data processing system determined using the aforementioned reward function.

At a step 1030, the data processing system may train the prediction model using the generated training data. To do so, the data processing system may cause the prediction model to predict a reward based on the state and the predicted candidate workspace. The data processing may use backpropagation techniques using the reward determined using the reward function to adjust the weights and/or parameters of the prediction model. For example, the data processing system may determine a difference between the determined reward and the predicted reward for the candidate workspace and train the prediction model based on the difference.

In some embodiments, the data processing system train the prediction model by determining the ideal Q value Q* using the equation:

$$Q^*(s, a) = r + \gamma * \max_{a'} Q(s', a')$$

where s is the current state (e.g., room occupancy states), a is the current action (e.g., assigned candidate workspace), s' is the future state after performing action a at state s, r is the reward for performing action a at state s, γ is the discount rate of future rewards and $$\max_{a'} Q(s', a')$$

is the maximum Q value for all possible actions a' in state s'. A backpropagation algorithm can then reduce the error:

$$e = \|Q_i - Q_i^*\|$$

where $Q_i$ is the output Q value for an input sample i, and $Q_i^*$ is the ideal output for input sample i.

In some embodiments, the data processing system may simulate multiple state-action pairs and determine rewards based on the simulated state-action pairs to train the prediction model. The data processing system may store a set of training state-action pairs (in some cases with a corresponding zone occupancy state and/or a user rating) and generate training data with the set. The data processing system may input the training data into the prediction model for training as described herein until the data processing system determines the prediction model is accurate to a threshold.

Upon determining the prediction model is trained to an accuracy threshold, the data processing system may implement the prediction model to predict workspace assignments for individuals as they enter the building. The prediction models may predict workspaces and receive user feedback in real-time while the data processing system determines rewards for the predicted workspaces to continue training the prediction model after it has been implemented.

In some embodiments, the data processing system may implement a reward threshold to determine whether to assign an employee to any workspaces. For example, the data processing system may input the current state of the spaces and candidate workspaces into the prediction model upon detecting an employee has entered a building. The data processing system may identify the candidate workspace that is associated with the highest reward and compare the reward to a threshold. Responsive to determining the reward is less than the threshold, the data processing system may determine there is not a space to assign the employee, and generate a notification for display to indicate the employee could not be assigned to any workspaces. Such may be advantageous if adding an employee to a workspace would cause too many people to be in an area, increasing the chances of spreading an infectious disease to an unacceptable level.

Advantageously, because the data processing system may use the distances between different spaces within the building to train the prediction model, the data processing system may train the model to reduce the distances between people as they work or otherwise occupy the building throughout the day. For example, the prediction model may be trained to reduce the distance between the assigned workspace and workspaces that the employee is scheduled to meet with other people throughout the day, thus minimizing the distance the person has to travel and/or the number of occupied workspaces the employee must pass to go to his or her scheduled meeting. In another example, the data processing system may reduce the distance between members of the same group entity or team. Because an employee may be more likely to walk to workspaces that are occupied by members of the same team or employer as the employee, the data processing system may be trained to predict workspaces that are closer to team members to reduce the instances in which the employee walks past other occupied workspaces.

Another advantage to using the aforementioned reward function to train the prediction model is that the reward function can take the current state of the HVAC equipment and/or lighting of the zone in which the respective candidate workspace is located into account. Such states may indicate whether the zone has any current occupants. Weights may be associated or assigned to HVAC equipment and lighting separately or together. The data processing system may assign a high weight to HVAC equipment and/or lighting states to avoid sending employees to workspaces in an unoccupied zone, which may result in the data processing system turning on the HVAC equipment and/or lighting to reach a desired setpoint for the employee. By assigning employees to workspaces in zones in which the HVAC equipment and/or lighting is already turned on, the data processing system may save energy by avoiding turning on HVAC equipment. Instead, in some embodiments, the data processing system may assign employees to zones, identify the new occupancy status of the respective zone (e.g., the number of people within the zone), and adjust lighting and/or HVAC equipment so the zone may remain at predetermined setpoints.

Figure 11:
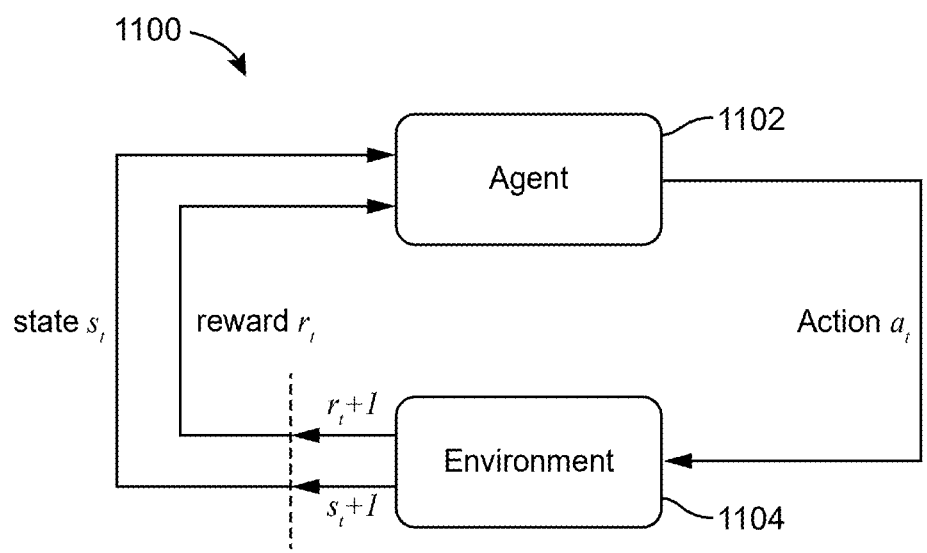
FIG. 11 is a block diagram of a prediction model for predicting workspaces to assign arriving building employees, according to some embodiments.

Referring now to FIG. 11, a block diagram of an environment 1100 of a reinforcement learning model 1102 that is trained to predict actions that affect a building environment 1104 is shown, according to some embodiments. The reinforcement learning model 1102 may be a deep Q-Learning model or a policy gradient model that uses machine learning techniques to predict actions to affect building environment 1104. Such actions may be assigning a person to a workspace within building environment 1104. Reinforcement learning model 1102 may be trained to use the states of the spaces (e.g., workspaces and meeting rooms) within building environment 1104 and identifications of candidate workspaces to output rewards for different actions (e.g., workspace assignments). A data processing system may identify the output rewards and select the candidate workspace action that is associated with the highest reward to assign an employee. Examples of states include unoccupied, occupied, occupied by a team member of the person being assigned a workspace, unscheduled meeting room, scheduled meeting room, etc. As described herein, reinforcement learning model 1102 may predict an unoccupied space to assign an employee to increase a reward for a time period (e.g., a day).

Figure 12:
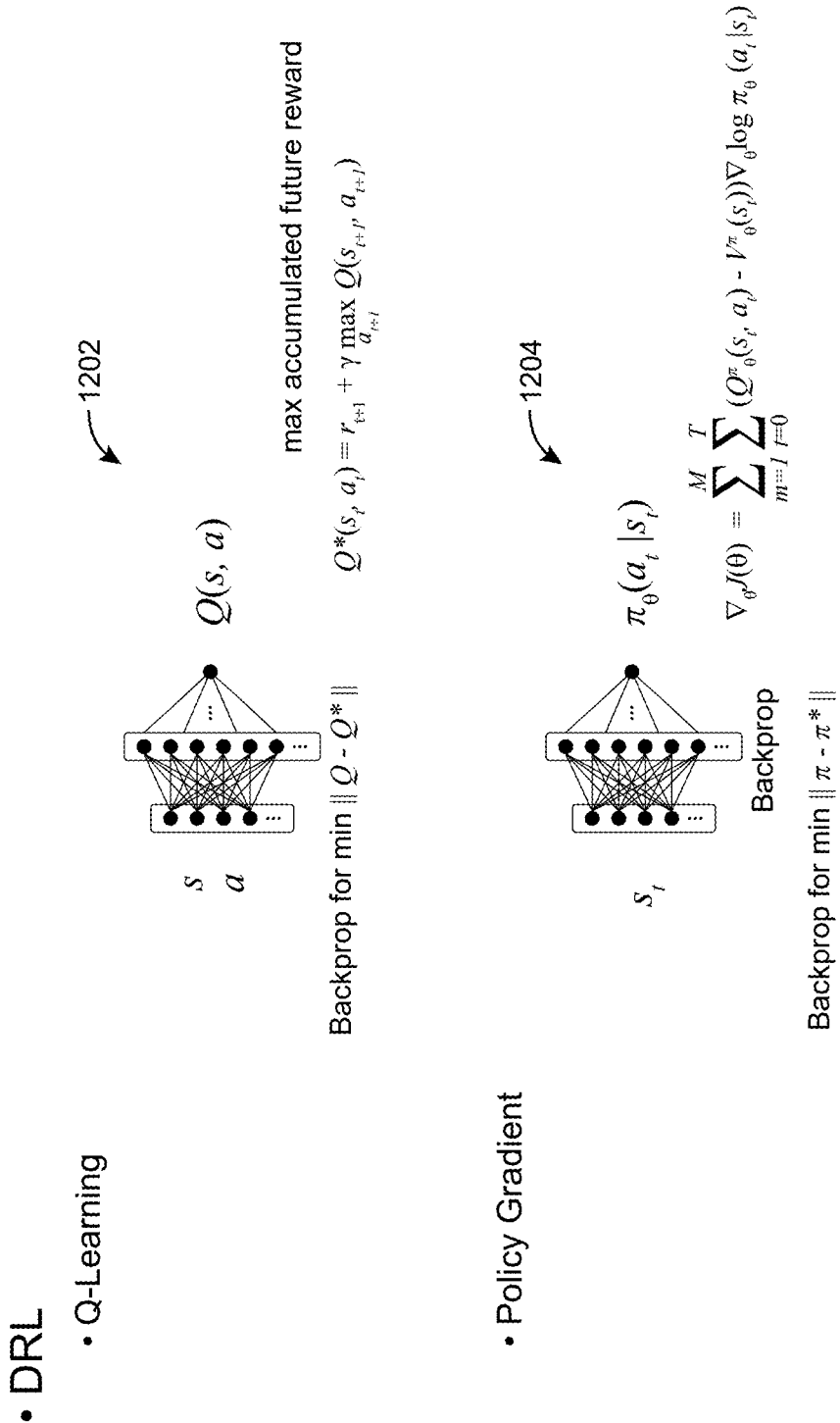
FIG. 12 illustrates two example reinforcement learning models, according to some embodiments.

Referring now to FIG. 12, an illustration of two example reinforcement learning models, a deep Q-Learning model 1202 and a policy gradient model 1204, is shown, according to some embodiments. Deep Q-Learning model may be initialized as a deep neural network, where experience data is received as input into the model and a Q value for the input experience data is generated as the output. The deep Q-Learning neural network may use backpropagation techniques to train weights of the network such that the Q function produces more accurate outputs compared to expected outputs. The ideal Q value Q* may be calculated as:

$$Q^*(s, a) = r + \gamma * \max_{a'} Q(s', a')$$

where s is the current state, a is the current action, s' is the future state after performing action a at state s, r is the reward for performing action a at state s, γ is the discount rate of future rewards, and $$\max_{a'} Q(s', a')$$

is the maximum Q value for all possible actions a' in state s'. A backpropagation algorithm can then reduce the error:

$$e = \|Q_i - Q_i^*\|$$

where $Q_i$ is the output Q value for an input sample i, and $Q_i^*$ is the ideal output for input sample i.

For policy gradient model 1204, the current state of the sampled experience data may be input into policy gradient model 1204 to generate an action vector. The action vector can be compared to the expected action for a given state in the sampled experience data. The policy gradient may be represented as a neural network, and may use a gradient backpropagation method according to the equation:

$$\nabla_\theta J(\theta) = \sum_{m=1}^{M} \sum_{t=0}^{T} (Q_\theta^\pi(s_t, a_t) - V_\theta^\pi(s_t)) * \nabla_\theta \log \pi_\theta(a_t \mid s_t)$$

where J(θ) is the expected reward, T is the number of states considered in a policy gradient trajectory, with t as the iterative variable over the trajectory, M is the number of samples considered with m as the iterative variable, $Q_\theta^\pi(s_t, a_t) - V_\theta^\pi(s_t)$ defines the reward of taking action $a_t$ in state $s_t$ (with $Q_\theta^\pi$ being a Q function of future projected value, and $V_\theta^\pi$ being a value function of the current state). Using the gradient of J(θ), the reward function can be used (e.g., increased to a high amount) to derive an actionable policy for a given state or trajectory of states and actions.

A building management system may train deep Q-Learning model 1202 or policy gradient model 1204 to predict workspaces to assign employees when the employees enter a building. The building management system may train the respected models using real-time data or simulated data. Once the building management system determines either of deep Q-Learning model 1202 or policy gradient model 1204 is sufficiently trained (e.g., trained to an accuracy above a threshold), the building management system may implement the respective model to assign employees to workspaces to reduce the spread of infectious diseases and/or energy costs.

Further, the building management system may use the output of the model to adjust the building equipment configuration of the building. For example, upon assigning an employee to a workspace, the building management system may adjust the building equipment that manages the setpoints (e.g., temperature or humidity) of the zone of the workspace based on the change in occupancy of the zone. In some cases, the building management system may cause the building equipment (e.g., HVAC equipment or lighting) to turn on, such as when the zone was previously unoccupied and did not require lighting or operation of HVAC equipment to maintain a setpoint.

Figure 13:
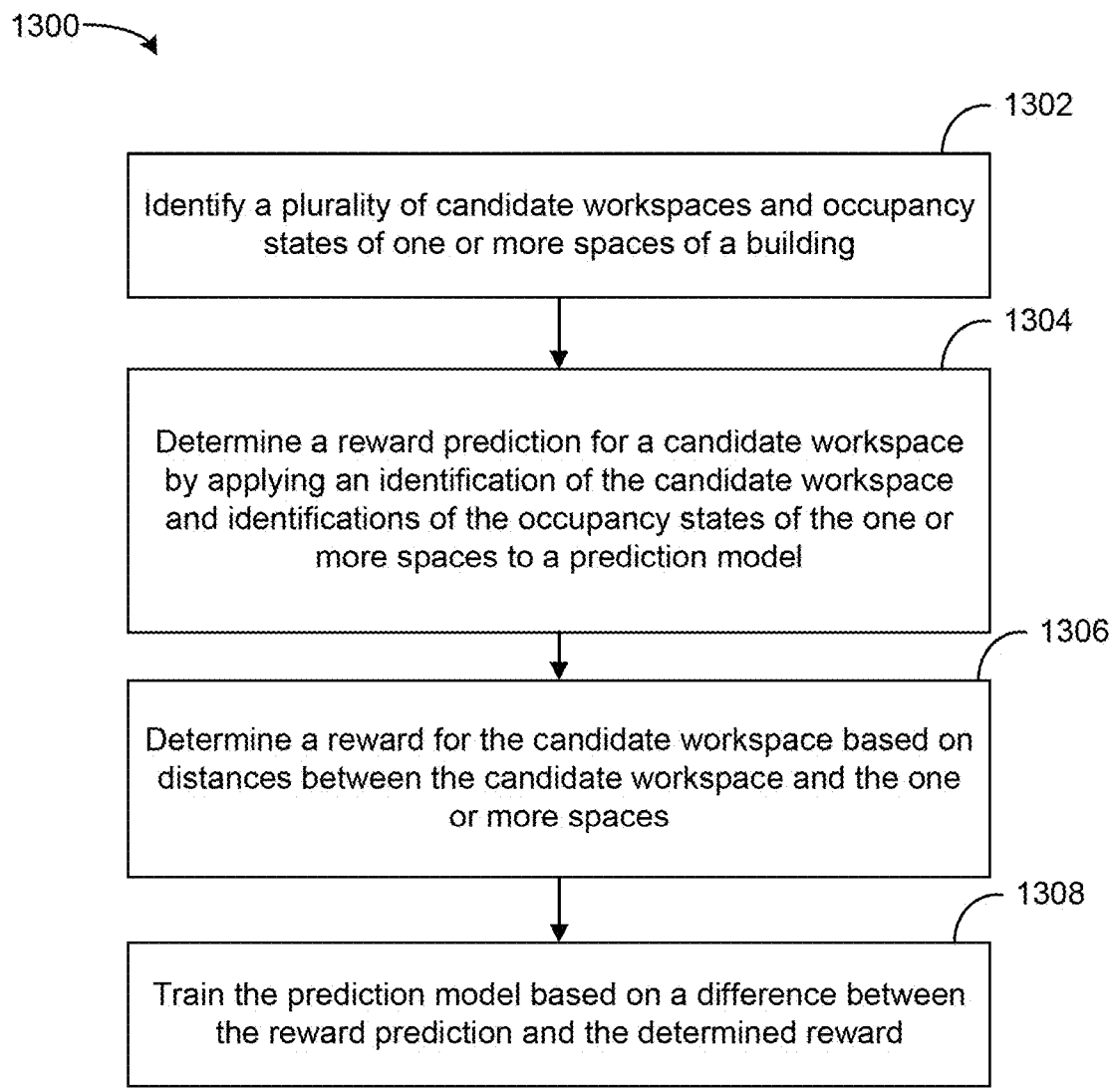
FIG. 13 is another flow diagram of a process for improved workspace recommendations according to distances between spaces, according to some embodiments.

Referring now to FIG. 13, another flow diagram of a process 1300 for improved workspace recommendations according to distances between spaces is shown, according to some embodiments. Process 1300 may be performed by a data processing system (e.g., workspace allocation system 602). Process 1300 may include any number of steps and the steps may be performed in any order. At a step 1302, the data processing system may identify a plurality of candidate workspaces and occupancy states of one or more spaces of a building. At a step 1304, the data processing system may determine a reward prediction for a candidate workspace by applying an identification of the candidate workspace and identifications of the occupancy states of the one or more spaces to a prediction model. At a step 1306, the data processing system may determine a reward for the candidate workspace based on distances between the candidate workspace and the one or more spaces. At a step 1308 the data processing system may train the prediction model based on a difference between the reward prediction and the determined reward.

Configuration of Exemplary Embodiments

It should be appreciated that the systems and methods disclosed herein can be used to control any building equipment system that affects a condition of a building or space, such as, but not limited to, an HVAC system, waterside system, airside system, electrical system, or any other building equipment system. The illustrations and descriptions herein describe embodiments configured to control of an HVAC system, but these and other embodiments can be extended to control any one of the other building equipment systems.

It should also be appreciated that the systems and methods disclosed herein can utilize any machine learning control algorithm. RL and DRL models provide a framework for state-driven control using training data, but other models can be used to control the building equipment, such as, but not limited to, genetic algorithm control, neural network control, artificial intelligence, and other machine learning control.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for improved workspace recommendations according to distances between spaces, comprising:
  determining, by one or more processors, for a candidate workspace of a plurality of candidate workspaces to which a user can be assigned:
    distances between the candidate workspace and one or more other spaces of a building, the other spaces of the building comprising a first set of one or more occupied workspaces to which the user cannot be assigned and a second set of one or more spaces of the building in which the user will be located according to a schedule of the user, wherein the plurality of candidate workspaces, the first set of the one or more occupied workspaces, and the second set of the one or more spaces in which the user will be located according to the schedule of the user are separate sets of spaces of the building; and whether building equipment that serves the candidate workspace will consume additional energy as a result of assigning the user to the candidate workspace;

assigning, by the one or more processors, a first weight to the distances between the candidate workspace and the one or more occupied workspaces to which the user cannot be assigned and a second weight to the distances between the candidate workspace and the one or more spaces of the building in which the user will be located according to the schedule of the user;

determining, by the one or more processors, a prediction score for the candidate workspace by aggregating a first sum of the distances between the candidate workspace and the one or more occupied workspaces according to the first weight with a second sum of the distances between the candidate workspace and the one or more spaces in which the user will be located according to the schedule of the user according to the second weight and based on whether the building equipment that serves the candidate workspace will consume additional energy as a result of assigning the user to the candidate workspace;

automatically, by the one or more processors, assigning the user to the candidate workspace based on the prediction score; and automatically, by the one or more processors, adjusting environmental conditions in the candidate workspace by turning on at least one of lighting, ventilation, air conditioning, or power in the candidate workspace to accommodate the user working in the candidate workspace, wherein adjustment of the environmental conditions changes the environmental conditions from prior environmental conditions for an unoccupied state of the candidate workspace prior to assigning the user to the candidate workspace and the environmental conditions are returned to the prior environmental conditions for the unoccupied state when the user is no longer assigned to the candidate workspace.

2. The method of claim 1, further comprising:
determining, by the one or more processors, a minimum distance flag has been selected; and
responsive to the determination that the minimum distance flag has been selected, filtering, by the one or more processors, candidate workspaces from the plurality of candidate workspaces that are associated with a determined distance from an occupied workspace that is below a threshold.

3. The method of claim 2, further comprising:
generating, by the one or more processors, a distance matrix comprising identifications of occupied workspaces and unoccupied workspaces; and
updating, by the one or more processors, the distance matrix to exclude the candidate workspaces that are associated with a determined distance from an occupied workspace that is below the threshold.

4. The method of claim 1, further comprising:
determining, by the one or more processors, whether a space in which the candidate workspace is located is associated with active HVAC equipment; and
assigning, by the one or more processors, a third weight to the determination as to whether the space in which the respective candidate workspace is located is associated with active HVAC equipment,
wherein determining the prediction score for the candidate workspace further comprises aggregating the weighted determination.

5. The method of claim 1, further comprising:
receiving, by the one or more processors, one or more workspace ratings for the candidate workspace; and
assigning, by the one or more processors, a third weight to the one or more workspace ratings,
wherein determining the prediction score for the candidate workspace further comprises aggregating the weighted workspace ratings.

6. The method of claim 1, further comprising:
ranking, by the one or more processors, the plurality of candidate workspaces according to respective predictions scores of the plurality candidate workspaces,
wherein assigning the user to the workspace is further based on the rankings of the plurality of candidate workspaces.

7. The method of claim 1, further comprising:
assigning, by the one or more processors, a time period to the recommendation assigning the user to the candidate workspace.

8. A system for generating improved workspace recommendations according to distances between spaces, comprising:
one or more processors configured to:
determine for a candidate workspace of a plurality of candidate workspaces to which a user can be assigned:
distances between the candidate workspace and one or more other spaces of a building, the other spaces of the building comprising a first set of one or more occupied workspaces to which the user cannot be assigned and a second set of one or more spaces of the building in which the user will be located according to a schedule of the user, wherein the plurality of candidate workspaces, the first set of the one or more occupied workspaces, and the second set of the one or more spaces in which the user will be located according to the schedule of the user are separate sets of spaces of the building; and
whether building equipment that serves the candidate workspace will consume additional energy as a result of assigning the user to the candidate workspace;
assign a first weight to the distances between the candidate workspace and the one or more occupied workspaces to which the user cannot be assigned and a second weight to the distances between the candidate workspace and the one or more spaces of the building in which the user will be located according to the schedule of the user;
determine a prediction score for the candidate workspace by aggregating a first sum of the distances between the candidate workspace and the one or more occupied workspaces according to the first weight with a second sum of the distances between the candidate workspace and the one or more spaces in which the user will be located according to the schedule of the user according to the second weight and based on whether the building equipment that serves the candidate workspace will consume additional energy as a result of assigning the user to the candidate workspace;

automatically assign the user to the candidate workspace based on the prediction score; and automatically adjust environmental conditions in the candidate workspace or turn on by turning on at least one of lighting, ventilation, air conditioning, or power in the candidate workspace to accommodate the user working in the candidate workspace, wherein adjustment of the environmental conditions changes the environmental conditions from prior environmental conditions for an unoccupied state of the candidate workspace prior to assigning the user to the candidate workspace and the environmental conditions are returned to the prior environmental conditions for the unoccupied state when the user is no longer assigned to the candidate workspace.

9. The system of claim 8, wherein the one or more processors are further configured to:

determine that a minimum distance flag has been selected; and responsive to the determination that the minimum distance flag has been selected, filter candidate workspaces from the plurality of candidate workspaces that are associated with a determined distance from an occupied workspace that is below a threshold.

10. The system of claim 8, wherein the one or more processors are further configured to:

generate a distance matrix comprising identifications of occupied workspaces and unoccupied workspaces; and update the distance matrix to exclude the candidate workspaces that are associated with a determined distance from an occupied workspace that is below a threshold.

11. The system of claim 8, wherein the one or more processors are further configured to:

determine whether a space in which the candidate workspace is located is associated with active HVAC equipment; and assign a third weight to the determination as to whether the space in which the respective candidate workspace is located is associated with active HVAC equipment, wherein determining the prediction score for the candidate workspace further comprises aggregating the weighted determination.

12. The system of claim 8, wherein the one or more processors are further configured to:

receive one or more workspace ratings for the candidate workspace; and assign a third weight to the one or more workspace ratings, wherein determining the prediction score for the candidate workspace further comprises aggregating the weighted workspace ratings.

13. The system of claim 8, wherein the one or more processors are further configured to:

rank the plurality of candidate workspaces according to respective predictions scores of the plurality candidate workspaces, wherein assigning the user to the workspace is further based on the rankings of the plurality of candidate workspaces.

14. The system of claim 8, wherein the one or more processors are further configured to:

assign a time period to the recommendation assigning the user to the candidate workspace.

15. A non-transitory computer-readable medium storing program instructions for causing one or more processors to:

determine for a candidate workspace of a plurality of candidate workspaces to which a user can be assigned:

distances between the candidate workspace and one or more other spaces of a building located within a same building zone as the candidate workspace and excluding spaces not located within the same building zone as the candidate workspace, the other spaces of the building comprising a first set of one or more occupied workspaces to which the user cannot be assigned and a second set of one or more spaces of the building in which the user will be located according to a schedule of the user, wherein the plurality of candidate workspaces, the first set of the one or more occupied workspaces, and the second set of the one or more spaces in which the user will be located according to the schedule of the user are separate sets of spaces of the building; and whether building equipment that serves the candidate workspace will consume additional energy as a result of assigning the user to the candidate workspace;

assign a first weight to the distances between the candidate workspace and the one or more occupied workspaces to which the user cannot be assigned and a second weight to the distances between the candidate workspace and the one or more spaces of the building in which the user will be located according to the schedule of the user;

determine a prediction score for the candidate workspace by aggregating a first sum of the distances between the candidate workspace and the one or more occupied workspaces according to the first weight with a second sum of the distances between the candidate workspace and the one or more spaces in which the user will be located according to the schedule of the user according to the second weight and based on whether the building equipment that serves the candidate workspace will consume additional energy as a result of assigning the user to the candidate workspace;

automatically assign the user to the candidate workspace based on the prediction score; and automatically adjust environmental conditions in the candidate workspace er turn on by turning on at least one of lighting, ventilation, air conditioning, or power in the candidate workspace to accommodate the user working in the candidate workspace, wherein adjustment of the environmental conditions changes the environmental conditions from prior environmental conditions for an unoccupied state of the candidate workspace prior to assigning the user to the candidate workspace and the environmental conditions are returned to the prior environmental conditions for the unoccupied state when the user is no longer assigned to the candidate workspace.

16. The non-transitory computer-readable medium of claim 15, wherein the program instructions further cause the one or more processors to:

determine that a minimum distance flag has been selected; and responsive to the determination that the minimum distance flag has been selected, filter candidate workspaces from the plurality of candidate workspaces that are associated with a determined distance from an occupied workspace that is below a threshold.

17. The non-transitory computer-readable medium of claim 15, wherein the program instructions further cause the one or more processors to:

generate a distance matrix comprising identifications of occupied workspaces and unoccupied workspaces; and update the distance matrix to exclude the candidate workspaces that are associated with a determined distance from an occupied workspace that is below a threshold.

18. The non-transitory computer-readable medium of claim 15, wherein the program instructions further cause the one or more processors to:
 determine whether a space in which the candidate workspace is located is associated with active HVAC equipment; and
 assign a third weight to the determination as to whether the space in which the respective candidate workspace is located is associated with active HVAC equipment,
 wherein determining the prediction score for the candidate workspace further comprises aggregating the weighted determination.

19. The non-transitory computer-readable medium of claim 15, wherein the program instructions further cause the one or more processors to:
 receive one or more workspace ratings for the candidate workspace; and assign a third weight to the one or more workspace ratings,
 wherein determining the prediction score for the candidate workspace further comprises aggregating the weighted workspace ratings.

20. The non-transitory computer-readable medium of claim 15, wherein the program instructions further cause the one or more processors to:
 rank the plurality of candidate workspaces according to respective predictions scores of the plurality candidate workspaces,
 wherein assigning the user to the workspace is further based on the rankings of the plurality of candidate workspaces.

\* \* \* \* \*